US012574100B2

(12) United States Patent
Kadan et al.

(10) Patent No.: US 12,574,100 B2
(45) Date of Patent: Mar. 10, 2026

(54) DIFFERENTIAL SENSING FOR JOINT COMMUNICATIONS AND SENSING

(71) Applicant: VIAVI Solutions Inc., Chandler, AZ (US)

(72) Inventors: Fehmi Emre Kadan, London (GB); Onur Dizdar, London (GB); Stephen Wang, London (GB)

(73) Assignee: VIAVI Solutions Inc., Chandler, AZ (US)

( * ) Notice: Subject to any disclaimer, the term of this patent is extended or adjusted under 35 U.S.C. 154(b) by 44 days.

(21) Appl. No.: 18/602,357

(22) Filed: Mar. 12, 2024

(65) Prior Publication Data

US 2025/0293756 A1      Sep. 18, 2025

(51) Int. Cl.
*H04B 7/08*      (2006.01)
*H04B 7/0426*      (2017.01)

(52) U.S. Cl.
CPC ........... *H04B 7/086* (2013.01); *H04B 7/0439* (2013.01)

(58) Field of Classification Search
None
See application file for complete search history.

(56) References Cited

U.S. PATENT DOCUMENTS

| | | | |
|---|---|---|---|
| 7,039,370 B2 * | 5/2006 | Laroia ..................... | H01Q 3/24 |
| | | | 375/267 |
| 7,522,562 B2 * | 4/2009 | Kent ................... | H04L 25/0242 |
| | | | 370/334 |
| 7,610,024 B2 * | 10/2009 | Laroia ................. | H01Q 3/2605 |
| | | | 455/562.1 |
| 7,889,809 B2 * | 2/2011 | Im ......................... | H04B 1/711 |
| | | | 375/267 |

(Continued)

FOREIGN PATENT DOCUMENTS

| | | | | |
|---|---|---|---|---|
| CA | 3232052 A1 * | 3/2023 | ........... | G01S 5/0273 |
| CN | 109314497 A * | 2/2019 | ........... | H03F 3/3022 |

(Continued)

OTHER PUBLICATIONS

Cong, D., et al., "Beamforming Design for Integrated Sensing and Communication Systems with Finite Alphabet Input", IEEE Wireless Communications Letters, IEEE, Piscataway, NJ, USA, vol. 11(10), Aug. 3, 2022, pp. 2190-2194.

(Continued)

*Primary Examiner* — Berhanu Tadese

(74) *Attorney, Agent, or Firm* — Harrity & Harrity, LLP

(57)      ABSTRACT

A device may estimate targets and angle-of-arrival (AoA) and angle-of-departure (AoD) pairs for the targets based on a sensing-aware beam-forming (SABF) signal and a sensing-aware beam-nulling (SABN) signal received from another device. The device may perform post-processing of the AoA and AoD pairs to modify estimation accuracies for (Continued)

100 the AoA and AoD pairs, and may estimate path loss values for paths of the targets. The device may determine positions of the targets based on the AoA and AoD pairs, and may perform one or more actions based on the positions of the targets. The device may receive communication pilots from the other device, and may determine transmitter calibration coefficients for the other device and receiver calibration coefficients for the device based on the communication pilots.

20 Claims, 12 Drawing Sheets

(56) References Cited

U.S. PATENT DOCUMENTS

| | | | | |
|---|---|---|---|---|
| 7,986,650 | B2 * | 7/2011 | Rofougaran | H04B 7/0871 |
| | | | | 370/310.2 |
| 8,571,493 | B2 * | 10/2013 | Laroia | H04B 7/0604 |
| | | | | 455/562.1 |
| 9,859,856 | B1 * | 1/2018 | Kauffman | H03F 3/3022 |
| 10,461,825 | B2 * | 10/2019 | Sandberg | H04B 7/022 |
| 10,594,277 | B2 * | 3/2020 | Kauffman | H04B 1/0475 |
| 10,841,026 | B2 * | 11/2020 | Dhananjay | H03H 17/06 |
| 11,589,386 | B2 * | 2/2023 | Aboul-Magd | H04B 7/0626 |
| 11,656,314 | B2 * | 5/2023 | Ranjbar | G01S 3/38 |
| | | | | 342/157 |
| 11,716,231 | B1 * | 8/2023 | Duan | H04L 27/2602 |
| | | | | 375/262 |
| 11,799,529 | B2 * | 10/2023 | Jeon | H04B 7/0617 |
| 11,910,435 | B2 * | 2/2024 | Aboul-Magd | H04W 74/0808 |
| 12,040,867 | B2 * | 7/2024 | Ma | H04W 72/23 |
| 12,052,073 | B2 * | 7/2024 | Duan | H04B 7/0639 |
| 12,192,043 | B2 * | 1/2025 | Hemadeh | H04L 27/36 |
| 12,309,614 | B1 * | 5/2025 | Chen | H04W 16/14 |
| 2010/0029320 | A1 * | 2/2010 | Malladi | H04L 27/2614 |
| | | | | 375/261 |
| 2012/0033592 | A1 * | 2/2012 | Kim | H04B 7/0417 |
| | | | | 375/240 |
| 2012/0034874 | A1 * | 2/2012 | Yiu | H04B 7/086 |
| | | | | 455/67.11 |
| 2013/0322565 | A1 * | 12/2013 | Rofougaran | H04B 7/0413 |
| | | | | 375/295 |
| 2022/0099783 | A1 * | 3/2022 | Ranjbar | G01S 3/043 |
| 2022/0099784 | A1 * | 3/2022 | Ranjbar | G01S 3/38 |
| 2022/0322116 | A1 * | 10/2022 | Aboul-Magd | H04W 24/10 |
| 2023/0076874 | A1 * | 3/2023 | Jeon | G01S 7/021 |
| 2023/0228844 | A1 * | 7/2023 | Advani | G01S 13/582 |
| | | | | 342/52 |
| 2023/0269676 | A1 * | 8/2023 | Mandelli | G01S 13/003 |
| | | | | 370/318 |
| 2023/0300813 | A1 * | 9/2023 | Bi | H04W 72/046 |
| | | | | 370/329 |
| 2023/0309132 | A1 * | 9/2023 | Duan | G01S 7/006 |
| 2023/0354228 | A1 * | 11/2023 | Kim | H04W 56/0015 |
| 2023/0393254 | A1 * | 12/2023 | Goyal | G01S 13/003 |
| 2023/0421215 | A1 * | 12/2023 | Duan | H04B 7/0417 |
| 2024/0007240 | A1 * | 1/2024 | Arslan | G01S 7/0233 |
| 2024/0049161 | A1 * | 2/2024 | Katla | G01S 13/003 |
| 2024/0056248 | A1 * | 2/2024 | Duan | H04L 5/0082 |
| 2024/0298279 | A1 * | 9/2024 | Liu | H04L 5/0039 |
| 2024/0319322 | A1 * | 9/2024 | Duan | H04W 52/243 |
| 2024/0319365 | A1 * | 9/2024 | Duan | G01S 13/723 |
| 2024/0323727 | A1 * | 9/2024 | Duan | H04W 24/10 |
| 2024/0323730 | A1 * | 9/2024 | Lee | H04B 7/0626 |
| 2024/0337744 | A1 * | 10/2024 | Duan | G01S 7/006 |
| 2024/0369674 | A1 * | 11/2024 | Duan | H04L 5/0051 |
| 2024/0422744 | A1 * | 12/2024 | Duan | G01S 13/003 |
| 2024/0429977 | A1 * | 12/2024 | Duan | H04B 7/0478 |
| 2025/0024301 | A1 * | 1/2025 | Yao | H04W 76/28 |
| 2025/0035731 | A1 * | 1/2025 | Jang | G01S 3/48 |
| 2025/0038817 | A1 * | 1/2025 | Li | H04W 24/02 |
| 2025/0056507 | A1 * | 2/2025 | Dai | H04W 72/0446 |
| 2025/0096879 | A1 * | 3/2025 | Tang | H04B 7/06952 |
| 2025/0097680 | A1 * | 3/2025 | Lee | H04W 24/10 |
| 2025/0175848 | A1 * | 5/2025 | Duan | H04W 28/0252 |
| 2025/0202568 | A1 * | 6/2025 | Ren | H04W 24/10 |
| 2025/0211401 | A1 * | 6/2025 | Zorgui | H04L 5/0051 |
| 2025/0237733 | A1 * | 7/2025 | Liu | H04L 5/0053 |
| 2025/0293756 | A1 * | 9/2025 | Kadan | H04B 7/0439 |

FOREIGN PATENT DOCUMENTS

| | | | | | |
|---|---|---|---|---|---|
| CN | 110494901 | A | * | 11/2019 | H04W 4/38 |
| CN | 113746493 | A | * | 12/2021 | H04B 7/0802 |
| CN | 113866715 | A | * | 12/2021 | G01S 3/48 |
| CN | 116724574 | A | * | 9/2023 | H04B 7/0617 |
| CN | 116781104 | A | * | 9/2023 | H04L 1/0027 |
| CN | 116963103 | A | * | 10/2023 | H04B 7/0695 |
| CN | 116980918 | A | * | 10/2023 | G01S 13/89 |
| CN | 117044344 | A | * | 11/2023 | H04L 1/0026 |
| CN | 115021843 | B | * | 1/2024 | H04B 17/382 |
| CN | 109314497 | B | * | 2/2024 | H03F 3/245 |
| CN | 117650863 | A | * | 3/2024 | G01S 13/06 |
| CN | 117713879 | A | * | 3/2024 | H04B 7/0408 |
| CN | 117917159 | A | * | 4/2024 | G01S 7/021 |
| CN | 117980766 | A | * | 5/2024 | G01S 5/0273 |
| CN | 118075769 | A | * | 5/2024 | H04B 17/336 |
| CN | 118075905 | A | * | 5/2024 | H04L 5/0094 |
| CN | 118369897 | A | * | 7/2024 | H04L 27/2605 |
| CN | 118542035 | A | * | 8/2024 | G01S 13/003 |
| CN | 118947160 | A | * | 11/2024 | H04W 24/10 |
| CN | 119156778 | A | * | 12/2024 | H04B 7/0626 |
| CN | 119366121 | A | * | 1/2025 | H04W 72/1273 |
| CN | 119546975 | A | * | 2/2025 | H04L 5/0051 |
| CN | 119547377 | A | * | 2/2025 | H04W 72/0446 |
| CN | 119586060 | A | * | 3/2025 | H04L 5/0041 |
| CN | 119644241 | A | * | 3/2025 | |
| CN | 119731962 | A | * | 3/2025 | H04L 5/0007 |
| CN | 119836758 | A | * | 4/2025 | H04B 7/088 |
| CN | 120019582 | A | * | 5/2025 | H01Q 15/0086 |
| CN | 120113179 | A | * | 6/2025 | H04B 7/04013 |
| CN | 120113180 | A | * | 6/2025 | H04L 5/0048 |
| CN | 120188410 | A | * | 6/2025 | H04B 7/15528 |
| CN | 120226272 | A | * | 6/2025 | G01S 13/003 |
| EP | 3975438 | A1 | * | 3/2022 | G01S 3/48 |
| EP | 4187986 | A1 | * | 5/2023 | H04W 56/0015 |
| EP | 4235209 | A1 | * | 8/2023 | H04B 7/0695 |
| EP | 4498111 | A1 | * | 1/2025 | G01S 3/12 |
| EP | 4617723 | A1 | * | 9/2025 | H04B 7/0439 |
| ID | P202305263 | A | * | 7/2023 | |
| JP | 2006504342 | A | * | 2/2006 | H04L 25/0242 |
| JP | 2010213309 | A | * | 9/2010 | H04L 27/0012 |
| JP | 4981253 | B2 | * | 7/2012 | H04B 7/0854 |
| JP | 5307070 | B2 | * | 10/2013 | H04L 1/0017 |
| KR | 100383208 | B1 | * | 7/2003 | H04B 1/7097 |
| KR | 20230032994 | A | * | 3/2023 | H04W 52/34 |
| KR | 20230043076 | A | * | 3/2023 | H04W 56/0015 |
| KR | 20230107577 | A | * | 7/2023 | G01S 13/003 |
| KR | 20240115813 | A | * | 7/2024 | G01S 13/003 |
| KR | 20240118071 | A | * | 8/2024 | H04L 27/2605 |
| KR | 20240167792 | A | * | 11/2024 | G01S 7/021 |
| KR | 20250021445 | A | * | 2/2025 | H04W 24/10 |
| KR | 20250024510 | A | * | 2/2025 | H04W 72/1273 |
| KR | 20250045775 | A | * | 4/2025 | H04L 27/2636 |
| KR | 20250108618 | A | * | 7/2025 | G01S 13/003 |
| TW | I240229 | B | * | 9/2005 | G11C 11/22 |
| TW | 202424524 | A | * | 6/2024 | H04L 5/0007 |
| TW | 202429928 | A | * | 7/2024 | G01S 13/003 |
| TW | 202515143 | A | * | 4/2025 | H04L 5/0051 |
| WO | WO-2018004795 | A1 | * | 1/2018 | H03F 3/195 |
| WO | WO-2022019352 | A1 | * | 1/2022 | H04W 56/0015 |
| WO | WO-2022081800 | A1 | * | 4/2022 | G01S 13/003 |
| WO | WO-2022119001 | A1 | * | 6/2022 | H04B 7/06 |
| WO | WO-2022132112 | A1 | * | 6/2022 | G01S 7/0233 |
| WO | WO-2022132762 | A2 | * | 6/2022 | H04B 7/0617 |
| WO | WO-2023033523 | A1 | * | 3/2023 | H04W 88/02 |
| WO | WO-2023133828 | A1 | * | 7/2023 | H04W 64/006 |
| WO | WO-2023140571 | A1 | * | 7/2023 | H04B 7/06952 |
| WO | WO-2023198124 | A1 | * | 10/2023 | G01S 13/89 |
| WO | WO-2023198143 | A1 | * | 10/2023 | H04B 7/0695 |
| WO | WO-2023250238 | A1 | * | 12/2023 | H04W 72/1273 |

(56)          References Cited

FOREIGN PATENT DOCUMENTS

| | | | | |
|---|---|---|---|---|
| WO | WO-2024008304 A1 * | 1/2024 | ............ | G01S 7/006 |
| WO | WO-2024020257 A1 * | 1/2024 | ............ | H04L 5/0051 |
| WO | WO-2024025639 A1 * | 2/2024 | ............ | H04L 5/0044 |
| WO | WO-2024035978 A1 * | 2/2024 | ............ | H04L 5/0023 |
| WO | WO-2024044425 A1 * | 2/2024 | ............ | H04W 8/22 |
| WO | WO-2024078685 A1 * | 4/2024 | ......... | H04B 7/04013 |
| WO | WO-2024100638 A1 * | 5/2024 | ............ | H04B 7/0482 |
| WO | WO-2024100639 A1 * | 5/2024 | ............ | H04B 7/0482 |
| WO | WO-2024109637 A1 * | 5/2024 | ............ | H04B 17/336 |
| WO | WO-2024115687 A1 * | 6/2024 | ............ | H04B 1/04 |
| WO | WO-2024117275 A1 * | 6/2024 | ............ | H04W 56/001 |
| WO | WO-2024123677 A1 * | 6/2024 | ............ | H04W 64/00 |
| WO | WO-2024149448 A1 * | 7/2024 | ............ | H04B 1/10 |
| WO | WO-2024152019 A1 * | 7/2024 | ......... | G06F 21/6218 |
| WO | WO-2024161219 A1 * | 8/2024 | ............ | H04B 7/0482 |
| WO | WO-2024174246 A1 * | 8/2024 | ............ | H04B 7/0695 |
| WO | WO-2024182091 A1 * | 9/2024 | ............ | G01S 13/325 |
| WO | WO-2024196497 A1 * | 9/2024 | ............ | H04W 24/08 |
| WO | WO-2024205459 A1 * | 10/2024 | ............ | H04B 17/221 |
| WO | WO-2024205748 A1 * | 10/2024 | ............ | H04L 5/0051 |
| WO | WO-2024205749 A1 * | 10/2024 | ............ | G01S 13/66 |
| WO | WO-2024205752 A1 * | 10/2024 | ............ | H04L 5/0048 |
| WO | WO-2024205812 A1 * | 10/2024 | ............ | H04L 5/0048 |
| WO | WO-2024223045 A1 * | 10/2024 | ............ | H04B 7/0695 |
| WO | WO-2024228810 A1 * | 11/2024 | ............ | H04L 5/0051 |
| WO | WO-2024248679 A1 * | 12/2024 | ............ | H04W 72/40 |
| WO | WO-2025018926 A1 * | 1/2025 | ............ | H04W 24/10 |
| WO | WO-2025021006 A1 * | 1/2025 | ............ | H04B 17/309 |
| WO | WO-2025045355 A1 * | 3/2025 | ............ | G01S 7/021 |
| WO | WO-2025045369 A1 * | 3/2025 | ............ | G01S 7/0232 |
| WO | WO-2025127976 A1 * | 6/2025 | ............ | G01S 7/0235 |

OTHER PUBLICATIONS

Extended European Search Report for European Application No. 25153416.0 dated Jun. 13, 2025, 9 pages.

Kadan, F., et al., "Differential Sensing for Rank-Limited Communications," IEEE Wireless Communications Letters, IEEE, Piscataway, 2024, vol. 13 (9), pp. 2422-2426.

Xu T., et al., "An Experimental Proof of Concept for Integrated Sensing and Communications Waveform Design," IEEE Open Journal of the Communications Society, 2022, vol. 3, pp. 1643-1655.

Wild et al., "Joint Design of Communication and Sensing for Beyond 5G and 6G Systems," IEEE Access, vol. 9, 2021, 13 Pages.

3rd Generation Partnership Project (3GPP), "Rel-19 Channel Modeling for ISAC and New Spectrum (7-24GHz) (RAN1-led)," Discussion Document RP-231798, Dec. 11-15, 2023, 3 Pages.

Liu et al., "Toward Dual-functional Radar-Communication Systems: Optimal Waveform Design," IEEE Transactions on Signal Processing, vol. 66, No. 16, Aug. 15, 2018, 16 Pages.

Ralph 0. Schmidt, "Multiple Emitter Location and Signal Parameter—Estimation," IEEE Transactions on Antennas and Propagation, vol. AP-34, No. 3, Mar. 1986, 5 Pages.

Co-pending U.S. Appl. No. 18/416,225 entitled "Precoder for Joint Communication and Sensing," by Kadan et al., filed Jan. 18, 2024, 64 Pages.

* cited by examiner

Figure 1B:
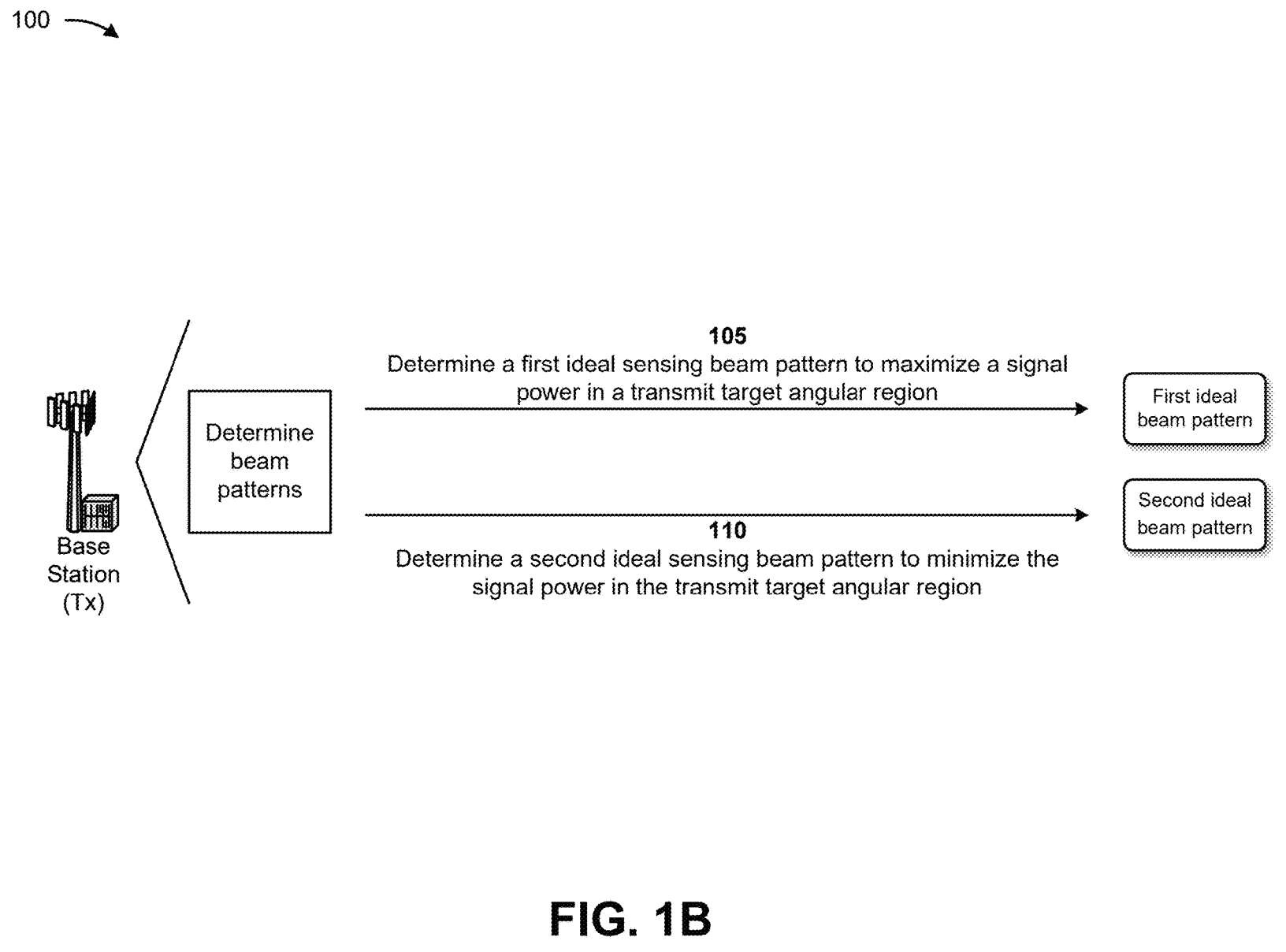

100

Base Station (Tx)

Determine beam patterns

105

Determine a first ideal sensing beam pattern to maximize a signal power in a transmit target angular region First ideal beam pattern

110

Determine a second ideal sensing beam pattern to minimize the signal power in the transmit target angular region Second ideal beam pattern

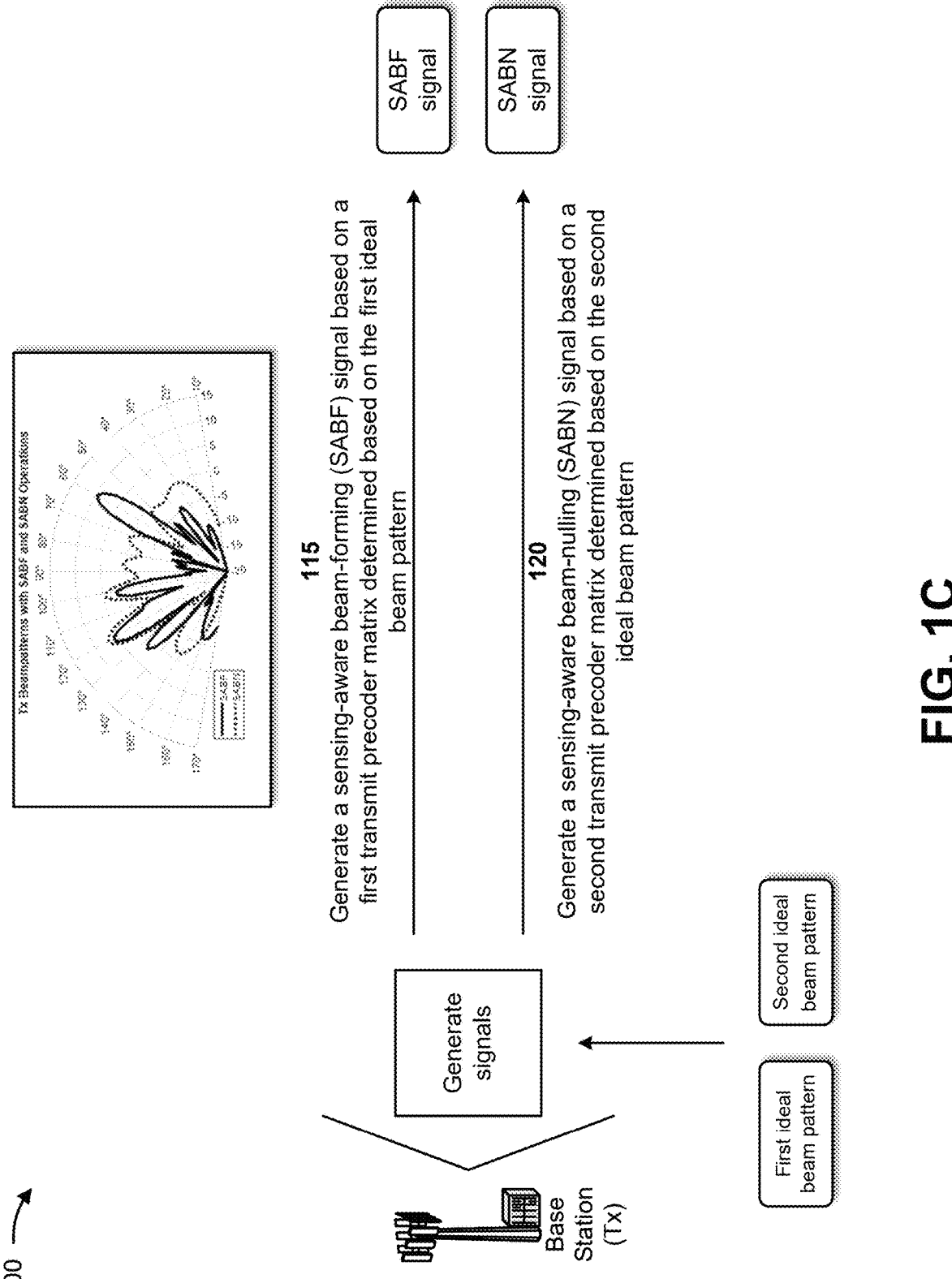

115
Generate a sensing-aware beam-forming (SABF) signal based on a first transmit precoder matrix determined based on the first ideal beam pattern 120
Generate a sensing-aware beam-nulling (SABN) signal based on a second transmit precoder matrix determined based on the second ideal beam pattern SABF signal SABN signal Generate signals Base Station (Tx)

First ideal beam pattern

Second ideal beam pattern

FIG. 1C

Figure 1H:
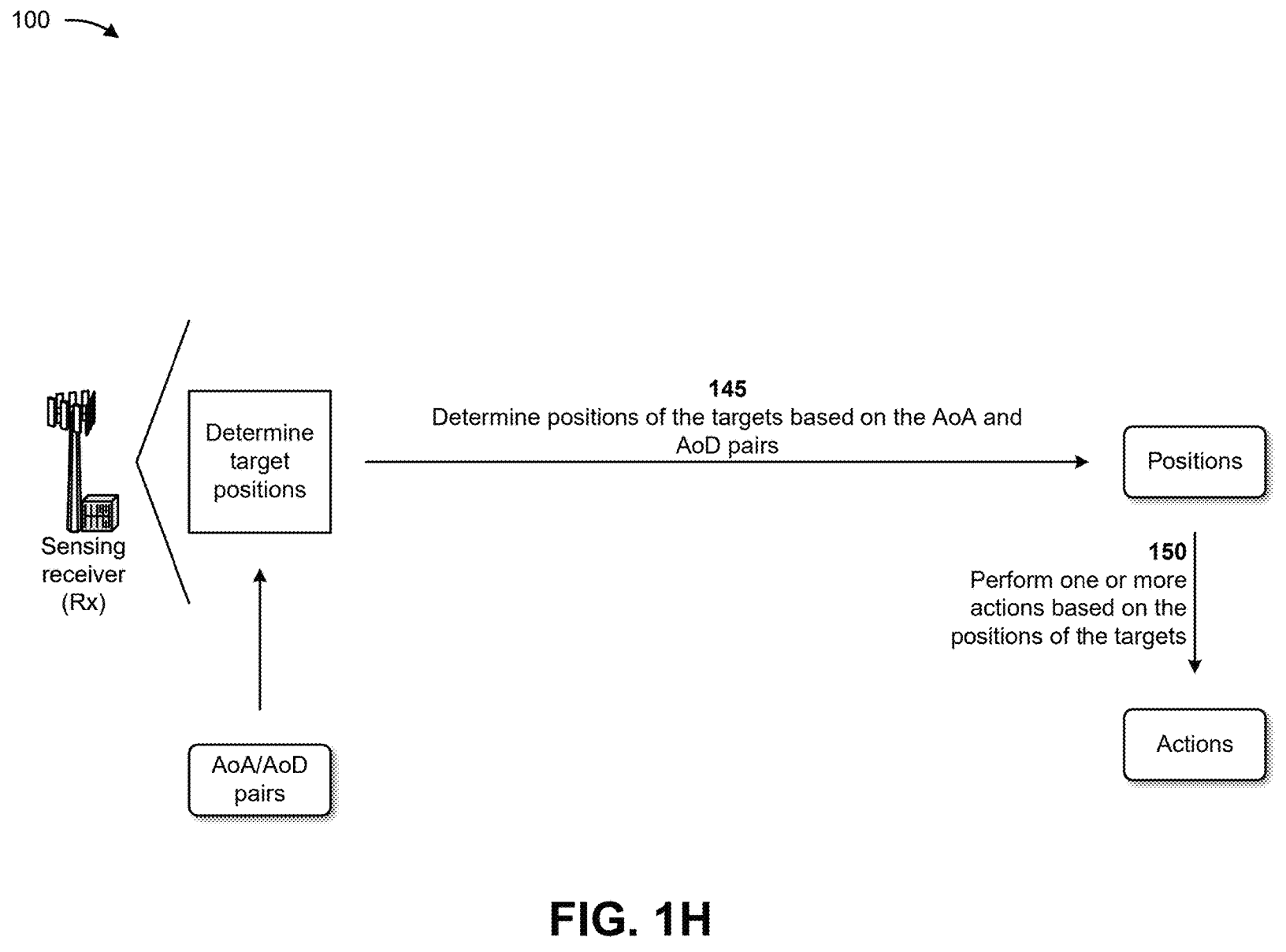

Positions

145
Determine positions of the targets based on the AoA and AoD pairs

150
Perform one or more actions based on the positions of the targets

Actions

Determine target positions

AoA/AoD pairs

Sensing receiver (Rx)

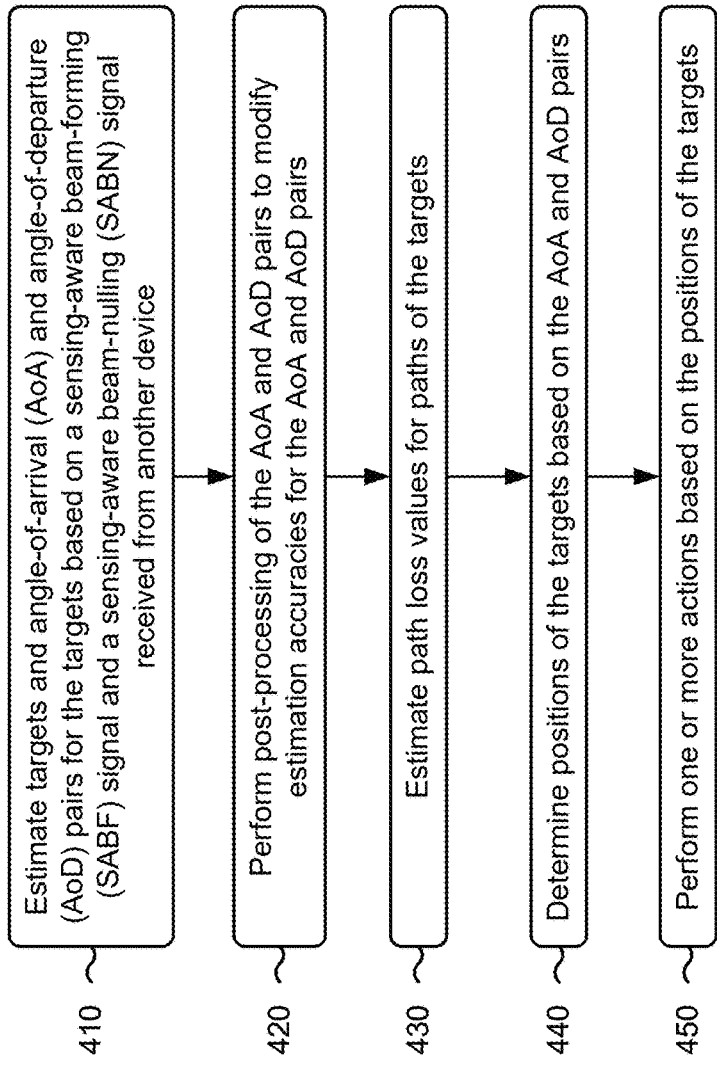

410 — Estimate targets and angle-of-arrival (AoA) and angle-of-departure (AoD) pairs for the targets based on a sensing-aware beam-forming (SABF) signal and a sensing-aware beam-nulling (SABN) signal received from another device 420 — Perform post-processing of the AoA and AoD pairs to modify estimation accuracies for the AoA and AoD pairs 430 — Estimate path loss values for paths of the targets 440 — Determine positions of the targets based on the AoA and AoD pairs 450 — Perform one or more actions based on the positions of the targets

DIFFERENTIAL SENSING FOR JOINT COMMUNICATIONS AND SENSING

BACKGROUND

Joint communications and sensing (JCAS) is a candidate sixth generation (6G) technology where sensing functionality is added to communication networks to enable new use-cases.

SUMMARY

Some implementations described herein relate to a method. The method may include estimating targets and angle-of-arrival (AoA) and angle-of-departure (AoD) pairs for the targets based on a sensing-aware beam-forming (SABF) signal and a sensing-aware beam-nulling (SABN) signal. The method may include performing post-processing of the AoA and AoD pairs to modify estimation accuracies for the AoA and AoD pairs, and estimating path loss values for paths of the targets. The method may include determining positions of the targets based on the AoA and AoD pairs, and performing one or more actions based on the positions of the targets.

Some implementations described herein relate to a device. The device may include one or more memories and one or more processors coupled to the one or more memories. The one or more processors may be configured to estimate targets and AoA and AoD pairs for the targets based on an SABF signal and an SABN signal received from another device. The one or more processors may be configured to perform post-processing of the AoA and AoD pairs to modify estimation accuracies for the AoA and AoD pairs, and estimate path loss values for paths of the targets. The one or more processors may be configured to utilize a triangulation technique to determine positions of the targets based on the AoA and AoD pairs, and perform one or more actions based on the positions of the targets.

Some implementations described herein relate to a non-transitory computer-readable medium that stores a set of instructions. The set of instructions, when executed by one or more processors of a device, may cause the device to estimate an AoA and AoD pair for a target based on an SABF signal and an SABN signal received from another device. The set of instructions, when executed by one or more processors of the device, may cause the device to perform post-processing of the AoA and AoD pair to modify an estimation accuracy for the AoA and AoD pair, and estimate a path loss value for a path of the target. The set of instructions, when executed by one or more processors of the device, may cause the device to determine a position of the target based on the AoA and AoD pair, and perform one or more actions based on the position of the target.

BRIEF DESCRIPTION OF THE DRAWINGS

FIGS. 1A-1I are diagrams of an example associated with differential sensing for joint communications and sensing.

FIG. 4 is a flowchart of an example process for differential sensing for joint communications and sensing.

DETAILED DESCRIPTION

Figure 1A:
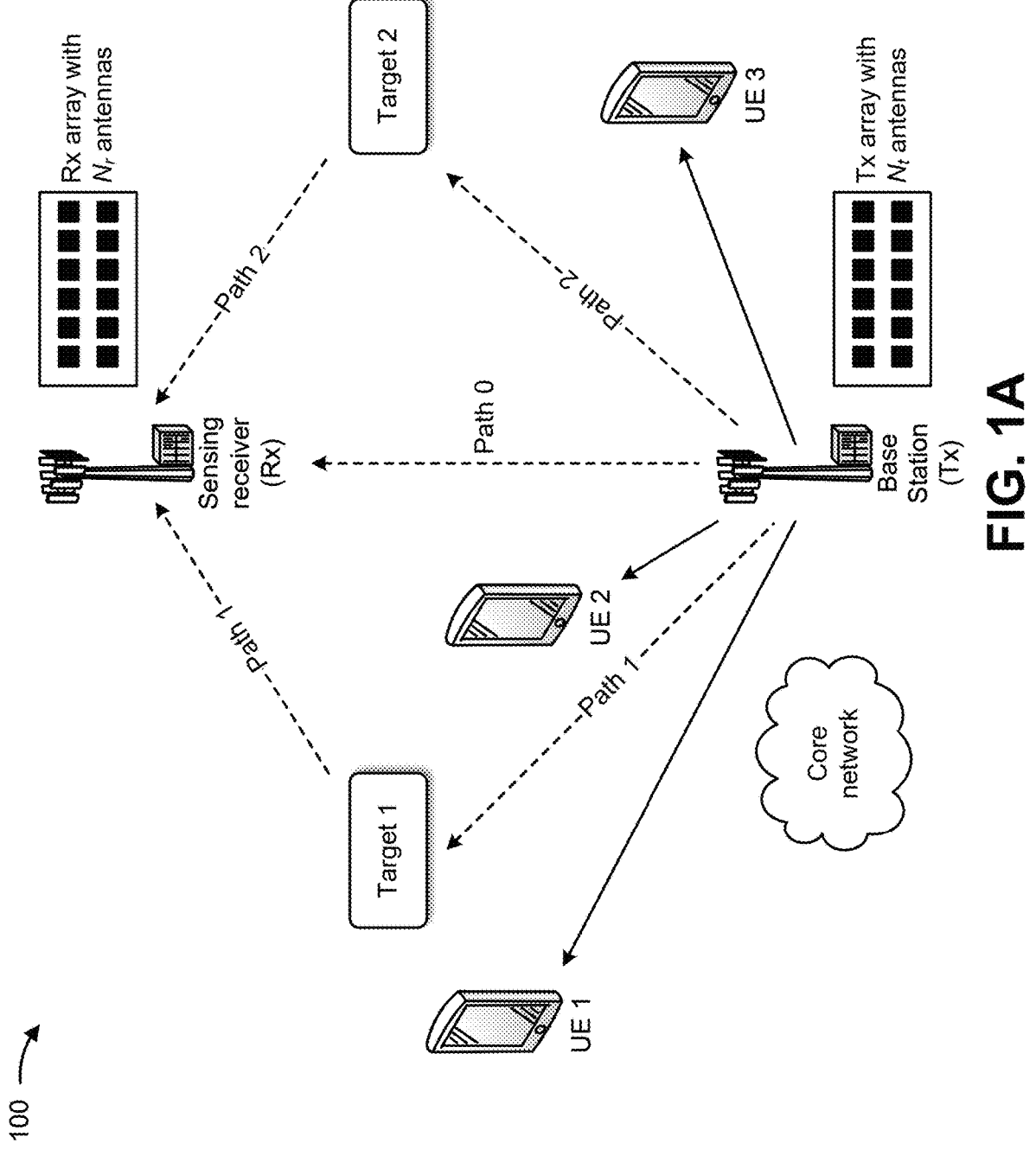

The following detailed description of example implementations refers to the accompanying drawings. The same reference numbers in different drawings may identify the same or similar elements.

In a joint communications and sensing (JCAS) system, the same radio frequency (RF) signal is used for communicating with user equipments (UEs) and for sensing nearby targets (e.g., objects, people, and/or the like). A JCAS system may include sensing modes, such as a base station monostatic sensing mode, a base station bistatic sensing mode, a base station-to-UE bistatic sensing mode, a UE-to-base station bistatic sensing mode, a UE monostatic sensing mode, and a UE bistatic sensing mode. In general, a JCAS transmitter (Tx) and sensing receiver (Rx) are at the same location in monostatic sensing modes to allow for rapid and easy information exchange between the JCAS transmitter and sensing receiver. On the other hand, there is strong self-interference between the JCAS transmitter and sensing receiver due to signal coupling from the JCAS transmitter to the sensing receiver as they operate at with same time and frequency resources. The bistatic sensing mode does not suffer from self-interference but an instantaneous information exchange may not be possible between the JCAS transmitter and sensing receiver as they are located separately.

Position estimation (e.g., via a delay calculation and/or an angle-of-departure (AoD)/angle-of-arrival (AoA) calculation), velocity estimation (e.g., via a Doppler frequency shift calculation), a radar cross section (RCS) estimation (e.g., via a path loss calculation) can be performed as sensing operations at the sensing receiver. The delay calculation requires high bandwidth for good precision, which might be problematic when only a small portion of a bandwidth is allocated. Furthermore, a complexity of a cross-correlation operation (e.g., required for the delay calculation) is high when the bandwidth is high. The Doppler frequency shift calculation needs to be very accurate to estimate velocity with high precision, and is sensitive to frequency errors between local oscillators of the JCAS transmitter and sensing receiver. Furthermore, current communication waveforms may not enable an accurate Doppler calculation. It is also difficult to achieve a very good frequency synchronization between the JCAS transmitter and sensing receiver in the bistatic sensing mode.

To estimate the AoA of multiple targets, a fixed transmit beam pattern (e.g., such as an omnidirectional beam or a directional beam designed according to target AoD information) can be adjusted at the JCAS transmitter and multi-resolution algorithms, such as multiple signal classification (MUSIC) can be applied to a received signal autocorrelation matrix at the sensing receiver. However, the number of AoAs that can be estimated is bound by a rank of the transmitted signal. In JCAS systems, the rank becomes the number of data streams transmitted to UEs, which may be limited depending on the scenario. In general, there is a strong line-of-sight path between the JCAS transmitter and sensing receiver which makes target position estimation more difficult as reflected signal paths from targets have less power compared to the line-of-sight path. Finally, instantaneous information exchange between the JCAS transmitter and sensing receiver may not be available due to the bistatic sensing mode.

Therefore, current techniques for sensing targets in a JCAS system consume computing resources (e.g., processing resources, memory resources, communication resources, and/or the like), networking resources, and/or the like associated with generating poor position estimates due to a limited number of estimated AoAs, generating poor position estimates due to the strong line-of-sight path between the JCAS transmitter and sensing receiver, decreasing resources for communications due to position estimating, performing incorrect actions based on poor position estimates, and/or the like.

Some implementations described herein relate to a base station (e.g., a sensing receiver) that provides differential sensing for joint communications and sensing. For example, the sensing receiver may estimate targets and AoA and AoD pairs for the targets based on a sensing-aware beam-forming (SABF) signal and a sensing-aware beam-nulling (SABN) signal received from a transmitter base station. The sensing receiver may perform post-processing of the AoA and AoD pairs to modify estimation accuracies for the AoA and AoD pairs, and may estimate path loss values for paths of the targets. The sensing receiver may determine positions of the targets based on the AoA and AoD pairs, and may perform one or more actions based on the positions of the targets. The sensing receiver may receive communication pilots from the transmitter base station, and may determine transmitter calibration coefficients for another base station and receiver calibration coefficients for the base station based on the communication pilots. The sensing receiver may calibrate a receiver antenna array of the sensing receiver with the receiver calibration coefficients, and may provide the transmitter calibration coefficients to the transmitter base station to cause the transmitter base station to calibrate a transmitter antenna array of the transmitter base station with the transmitter calibration coefficients.

In this way, the sensing receiver provides differential sensing for joint communications and sensing. For example, a transmitter base station of a JCAS system may utilize sweeping for transmitter sensing beams with sensing-aware beam-forming and beam-nulling operations. A sensing receiver of the JCAS system may apply an eigenspace analysis to a difference of autocorrelation matrices obtained from the sensing-aware beam-forming and beam-nulling operations. The sensing receiver may detect targets and may estimate an AoA and AoD pair for each detected target. The sensing receiver may perform a path loss estimation for each target path (e.g., which can be used to estimate RCS values), and may estimate a position of each detected target. The sensing receiver may also utilize communication pilots (e.g., demodulation reference signals (DMRS)), received from the transmitter base station, to calculate calibration coefficients for antenna arrays of the sensing receiver and the transmitter base station. Thus, the sensing receiver conserves computing resources, networking resources, and/or the like that would otherwise have been consumed by generating poor position estimates due to a limited number of estimated AoAs, generating poor position estimates due to the strong line-of-sight path between the JCAS transmitter and sensing receiver, decreasing resources for communications due to position estimating, performing incorrect actions based on poor position estimates, and/or the like.

FIGS. 1A-1I are diagrams of an example 100 associated with differential sensing for joint communications and sensing. As shown in FIGS. 1A-1I, example 100 includes a transmitter (Tx) base station, a sensing receiver (Rx), UEs (e.g., UE 1, UE 2, and UE 3), a core network, and targets (e.g., target 1 and target 2). Further details of the base station, the UEs, and the core network are provided elsewhere herein.

FIG. 1A depicts an example environment with three UEs and sensing paths between the transmitter base station and the sensing receiver. The environment of FIG. 1A may include a bistatic JCAS system where a downlink communication signal (e.g., a data signal and a pilot signal) is used also for sensing purposes. The sensing receiver may be separate from the transmitter base station in order to perform sensing operations (e.g., target detection, AoA estimation, position estimation, and/or the like). A dedicated connection (e.g., either cable or wireless and via the core network) may be provided between the transmitter base station and the sensing receiver for information exchange. As used herein, matrices and vectors may be denoted by uppercase and lowercase bold letters; $tr(\bullet)$, $\mathbb{E}[\bullet]$, $\|\bullet\|$, $(\bullet)^{\dagger}$ are trace, expectation, Frobenius ($\ell_2$) norm, and pseudoinverse operators, respectively; $\mathbb{C}$, $\mathbb{R}$ denote the set of complex and real numbers, respectively; $[A]_{i,j}$ denotes the entry at the i-th row and the j-th column of the matrix A; $\exp(A)$ denotes the matrix satisfying $[\exp(A)]_{i,j} = e^{[A]_{i,j}}$ for all entries; $A \succeq 0$ shows that the matrix A is Hermitian and positive semidefinite; $I_n$ denotes the n×n identity matrix; and vec(A) is a column vector obtained by concatenating columns of the matrix A in consecutive order.

In one example, there may be K single-antenna UEs to simultaneously receive data from the transmitter base station, with $N_t \geq K$ antennas at the same time/frequency resource block in multi-user mode. Each UE may receive T data samples in a resource block on which the communication channel is assumed to be constant. In this case, a received signal by the k-th UE can be written as:

$$y_k = \sum_{\ell=1}^{K} \left(h_k^T w_\ell\right) s_\ell + z_k,$$

where $y_k \in \mathbb{C}^{T \times 1}$ is the received signal vector, $h_k \in \mathbb{C}^{N_t \times 1}$ is the channel vector between the transmitter base station and the k-th UE, $w_k \in \mathbb{C}^{N_t \times 1}$ is the precoder vector designed by the transmitter base station for the k-th UE, $s_k \in \mathbb{C}^{T \times 1}$ is the intended information samples for the k-th UE, and $z_k \in \mathbb{C}^{T \times 1}$ is the noise samples at the k-th UE receiver. It may be assumed that $z_k \sim \mathcal{CN}(0, \sigma_k^2 I_T)$, where $\sigma_k^2$ is an average noise power at the k-th UE, $\mathbb{E}[s_k s_\ell^H] = 1/T$ if $k = \ell$ and $\mathbb{E}[s_k s_\ell^H] = 0$ if $k \neq \ell$. The term 1/T may have unity power for each block with T samples. After defining augmented matrices, the received signal of all UEs may be calculated as:

$$Y = HX + Z = HWS + Z,$$

where the matrices $Y \in \mathbb{C}^{K \times T}$, $H \in \mathbb{C}^{K \times N_t}$, $W \in \mathbb{C}^{N_t \times K}$, $S \in \mathbb{C}^{K \times T}$, $Z \in \mathbb{C}^{K \times T}$ are formed so that the k-th row of Y, H, S, Z are $y_k^T$, $h_k^T$, $s_k^T$, $z_k^T$, respectively, and the k-th column of W is $w_k$ for all k. For a perfect channel state information (CSI) case, it may be assumed that the channel matrix H is perfectly known by the transmitter base station. In this case, the signal model may be written as:

$$y_k = \sum_{\ell=1}^{K} \left(h_k^T w_\ell\right) s_\ell + z_k = \underbrace{\left(h_k^T w_k\right) s_k}_{desired} + \underbrace{\sum_{\ell \neq k} \left(h_k^T w_\ell\right) s_\ell}_{interference} + \underbrace{z_k}_{noise}.$$

A signal-to-interference-and-noise (SINR) for each user can be expressed as $$SINR_k = \frac{|h_k^T w_k|^2}{\mathbb{E}\left[\left|\sum_{\ell \neq k}(h_k^T w_\ell)s_\ell + z_k\right|^2\right]} = \frac{|h_k^T w_k|^2}{\sum_{\ell \neq k}^{K}|h_k^T w_\ell|^2 + \sigma_k^2}, \forall\, k. \qquad 5$$

The sensing receiver may include an antenna array with $N_r$ elements and there may be L targets separated in space. An i-th target may have an AoD at $\varphi_{t,i}$ and an AoA at $\varphi_{r,i}$, a path-gain $\alpha_i \in \mathbb{C}$ including a path loss, an amplitude drop due to reflection from the target, and a phase shift due to delay and frequency shift. A narrowband signal model may be utilized where a propagation delay for the signal that travels between the transmitter base station, and the sensing receiver is much smaller than a multiplicative inverse of a bandwidth of the signal. Under a narrowband signal assumption, the delay in the transmitted signal can be modeled as a phase shift which is considered inside the $\alpha_i$ coefficient. The AoD is measured with respect to the transmit antenna array at the transmitter base station, and the AoA is measured with respect to the receiver antenna array at the sensing receiver. A line-of-sight (LoS) path (e.g., path 0) may exist between the transmitter base station and the sensing receiver, with an AoD and AoA pair ($\varphi_{t,0}$, $\varphi_{r,0}$) and a path-gain $\alpha_0$ which is not related to any target reflection. FIG. 1A shows an example scenario with three UEs, two targets, an LoS path (e.g., Path 0), and two reflection paths (e.g., Path 1 and Path 2).

The received signal at the sensing receiver can be written as:

$$Y_r = \sum_{i=0}^{L}\alpha_i a_r^*(\varphi_{r,i})a_t^H(\varphi_{t,i})WS + Z_r,$$

where $Z_r$ includes the noise samples at the sensing receiver, $a_t(\varphi_{t,i})=\exp(j2\pi B_t u(\varphi_{t,i}))$ and $a_r(\varphi_{r,i})=\exp(j2\pi B_r u(\varphi_{r,i}))$ are array steering vectors for the transmit antenna array with the $N_t$ elements and the receiver antenna array with the $N_r$ elements, respectively, $B_t \in \mathbb{R}^{N_t \times 3}$ and $B_r \in \mathbb{R}^{N_r \times 3}$ are matrices including antenna positions (normalized by the wavelength) of the transmit and receiver antenna arrays, respectively, and $u(\varphi)=[\sin \varphi \,\cos \varphi\, 0]^T$ is a unit vector for an azimuth angle $\varphi$. It may be assumed that at both the transmitter base station and the sensing receiver there is a uniform linear array (ULA) with a half-wavelength spacing placed onto the x-axis and hence the transmit and receiver array steering vectors can be expressed as:

$$a_t(\varphi_{t,i}) = \left[1\; e^{j\pi \sin \varphi_{t,i}} e^{j2\pi \sin \varphi_{t,i}} \ldots e^{j(N_t-1)\pi \sin \varphi_{t,i}}\right]^T,$$

$$a_r(\phi_{r,i}) = \left[1\; e^{j\pi \sin \varphi_{r,i}} e^{j2\pi \sin \varphi_{r,i}} \ldots e^{j(N_r-1)\pi \sin \varphi_{r,i}}\right]^T,$$

which are functions of an azimuth angle by symmetry of ULA in elevation angles. The ULA assumption may simplify the analysis, and implementations described herein may be directly generalized to any array geometry. Since $\mathbb{E}[SS^H]=I_K$, $\mathbb{E}[Z_r Z_r^H]=\sigma_r^2 I_{N_r}$, it may be determined that $$R_y = \mathbb{E}\left[Y_r Y_r^H\right] = ARA^H + \sigma_r^2 I_{N_r},$$

where $R_y$ is an autocorrelation matrix of the received signal, and $$R = WW^H, A = \sum_{i=0}^{L}A_i, A_i = \alpha_i a_r^*(\varphi_{r,i})a_t^H(\varphi_{t,i}), \forall\, i.$$

The autocorrelation matrix $R_y$ may include information related to target AoD/AoAs and path-gains.

The following terminology may be utilized herein for parameters: $N_t$ is a number of antennas at the transmitter base station, $N_r$ is a number of antennas at the sensing receiver, K is a number of single-antenna UEs, T is a number of data samples received by each UE, $y_k$ is a signal vector received by a k-th UE, $h_k$ is a channel vector between the transmitter base station and the k-th UE, $w_k$ is a precoder vector designed by the transmitter base station for the k-th UE, $s_k$ is an intended information sample vector for the k-th UE, $z_k$ is a noise sample vector at the k-th UE receiver, $\sigma_k^2$ is an average noise power at the k-th UE, Y is a signal matrix received by all UEs, H is a channel matrix between the transmitter base station and all UEs, $H_0$ is a channel matrix between the transmitter base station and the sensing receiver, W is a precoder matrix designed by the transmitter base station for all UEs, S is an intended information sample matrix for all UEs, Z is a noise sample matrix at all UEs, X is a transmit signal matrix, $Y_r$ is a signal matrix received by the sensing receiver, $Z_r$ is a noise sample matrix at the sensing receiver, $R_y$ is an autocorrelation matrix of the received signal at the sensing receiver, $\alpha_i$ is a path gain for an i-th path, $a_t(\varphi_{t,i})$ is an array steering vector for the antenna array at the transmitter base station at AoD $\varphi_{t,i}$, $W_{t,1}$ is an array steering vector for the antenna array at the sensing receiver at AoA $\varphi_{r,i}$, $W_{t,1}$ is a precoder matrix designed by the transmitter base station for all UEs by maximizing a signal power at a specific direction, $W_{t,2}$ is a precoder matrix designed by the transmitter base station for all UEs by minimizing the signal power at a specific direction, $Y_{r,1}$ is a signal matrix received by the sensing receiver when the transmitter base station uses $W_{t,1}$, $Y_{r,2}$ is a signal matrix received by the sensing receiver when the transmitter base station uses $W_{t,2}$, $S_1$ is an intended information sample matrix for all UEs when the transmitter base station uses $W_{t,1}$, $S_2$ is an intended information sample matrix for all UEs when the transmitter base station uses $W_{t,2}$, $Z_{r,1}$ is a noise sample matrix at the sensing receiver when the transmitter base station uses $W_{t,1}$, $Z_{r,2}$ is a noise sample matrix at the sensing receiver when the transmitter base station uses $W_{t,2}$, $R_{y,1}$ is an autocorrelation matrix calculated at the sensing receiver when the transmitter base station uses $W_{t,1}$, $R_{y,2}$ is an autocorrelation matrix calculated at the sensing receiver when the transmitter base station uses $W_{t,2}$, $\Delta R_{y,b}$ is a difference of autocorrelation matrices calculated at the sensing receiver when the transmitter base station uses $W_{t,1}$ and $W_{t,2}$ obtained at a b-th beam sweeping stage, $\lambda_i$ is an i-th eigenvalue of $R_{y,1}-R_{y,2}$, $e_i$ is an eigenvector corresponding to the i-th eigenvalue of $R_{y,1}-R_{y,2}$, and $\theta_i$ is an i-th angle in set of angles for beam sweeping.

As shown in FIG. 1B, and be reference number 105, the transmitter base station may determine a first ideal sensing beam pattern to maximize a signal power in a transmitter target angular region. For example, sensing performance depends on a beam pattern created by the transmitter base station. The beam pattern for the transmitted signal is given by:

$$P(\varphi)=a_t^H(\varphi)\,\mathbb{E}\,[XX^H]a_t(\varphi)=a_t^H(\varphi)WW^H a_t(\varphi),$$

where $\varphi$ is the azimuth angle. To jointly optimize communication and sensing performances, one approach is to design a transmit precoder that maximizes the signal power at the UE locations while directing the signal towards a target point to detect if there is any target at a point of interest. To do this, two sensing precoders $W_{0,1}$ and $W_{0,2}$ may be calculated and then final transmit precoders $W_{t,1}$ and $W_{t,2}$ are designed to jointly optimize communication and sensing performances. The transmitter base station may determine an ideal sensing beam pattern $P_1(\varphi)$ to maximize the signal power in a transmit target angular region. Given a transmit target angular region $[\varphi_1, \varphi_2]$ for azimuth angles, the ideal directional beam pattern satisfies $P_1(\varphi)=1$ for $\varphi \in [\varphi_1, \varphi_2]$ and zero elsewhere.

As further shown in FIG. 1B, and by reference number 110, the transmitter base station may determine a second ideal sensing beam pattern to minimize the signal power in the transmit target angular region. For example, the transmitter base station may determine an ideal sensing beam pattern $P_2(\varphi)$ to minimize the signal power in a transmit target angular region. The transmitter base stations may minimize the signal power in a transmit target angular region defined similarly by $[\varphi_1, \varphi_2]$ for azimuth angles. In this case, the ideal beam pattern satisfies $P_2(\varphi)=0$ for $\varphi \in [\varphi_1, \varphi_2]$ and one elsewhere.

As shown in FIG. 1C, and by reference number 115, the transmitter base station may generate an SABF signal based on a first transmit precoder matrix determined based on the first ideal beam pattern. For example, the transmitter base station may design a first transmit precoder matrix $W_{t,1}$ using the first ideal sensing beam pattern $P_1(\varphi)$. Any JCAS transmit precoder design method can be used to design the first transmit precoder matrix $W_{t,1}$, provided that the designed beam pattern obtained for the first transmit precoder matrix $W_{t,1}$ has a significant power difference at the transmit target angular region. The transmitter base station may generate an SABF signal transmission using the first transmit precoder matrix $W_{t,1}$, where the signal power in a transmit target angular region is maximized.

As further shown in FIG. 1C, and by reference number 120, the transmitter base station may generate an SABN signal based on a second transmit precoder matrix determined based on the second ideal beam pattern. For example, the transmitter base station may design a second transmit precoder matrix $W_{t,2}$ using the second ideal sensing beam pattern $P_2(\varphi)$. Any JCAS transmit precoder design method can be used to design the second transmit precoder matrix $W_{t,2}$, provided that the designed beam pattern obtained for the second transmit precoder matrix $W_{t,2}$ has a significant power difference at the transmit target angular region. The transmitter base station may generate an SABN signal using the second transmit precoder matrix $W_{t,2}$, where the signal power in a transmit target angular region is minimized. The SABF signal and the SABN signal may be optimized jointly for communications and sensing and may have non-negligible gains outside the transmit target angular region for communication purposes.

Figure 1D:
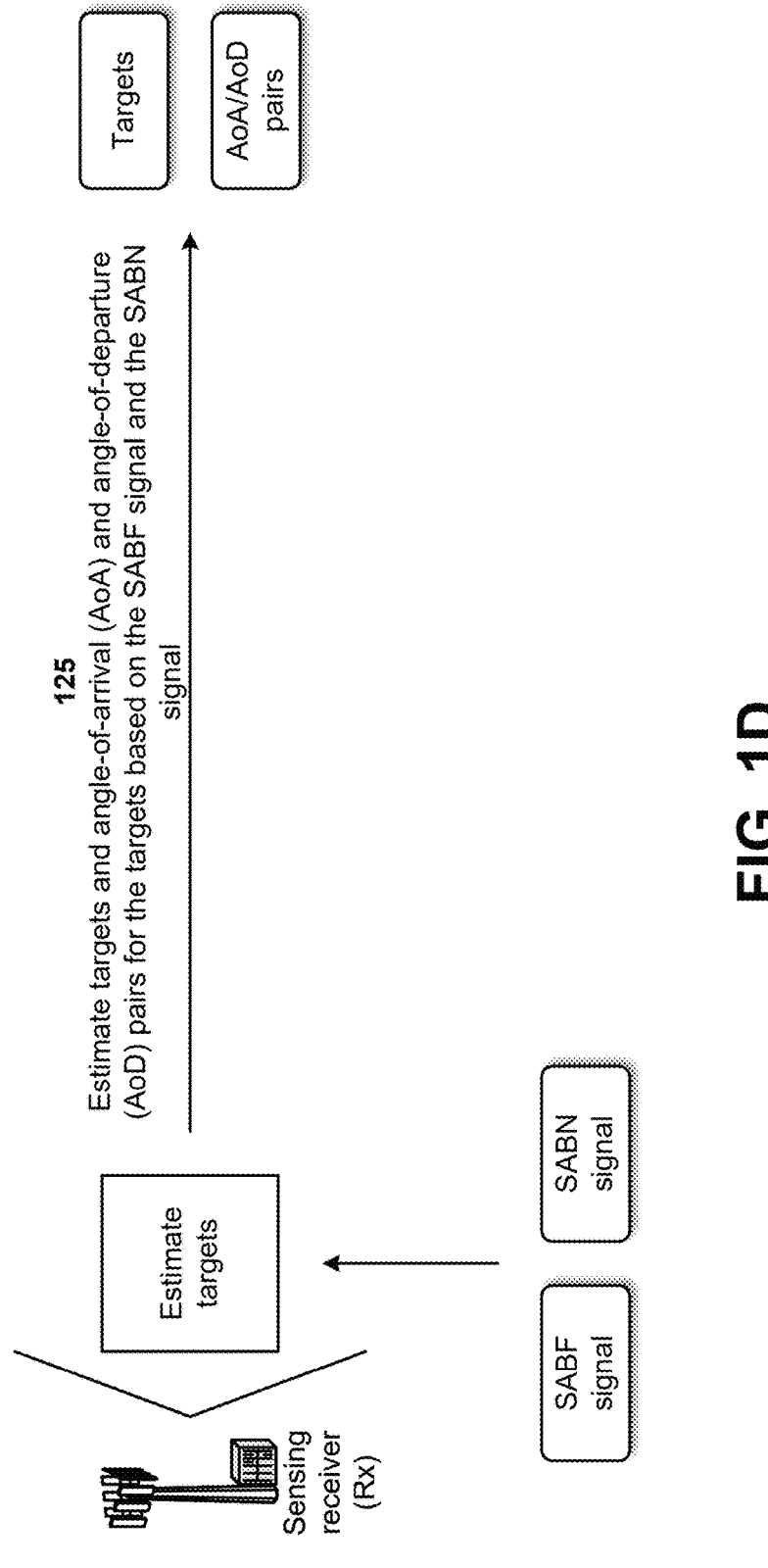

As shown in FIG. 1D, and by reference number 125, the sensing receiver may estimate targets and AoA and AoD pairs for the targets based on the SABF signal and the SABN signal. For example, a difference of autocorrelation matrices obtained at the sensing receiver may be utilized when the transmitter base station uses the first transmit precoder matrix $W_{t,1}$ (e.g., the SABF signal) and the second transmit precoder matrix $W_{t,2}$ (e.g., the SABN signal). The received signal in the two cases can be expressed as:

$$Y_{r,1} = \sum_{i=0}^{L} \alpha_i a_r^*(\varphi_{r,i}) a_t^H(\varphi_{t,i}) W_{t,1} S_1 + Z_{r,1},$$

$$Y_{r,2} = \sum_{i=0}^{L} \alpha_i a_r^*(\varphi_{r,i}) a_t^H(\varphi_{t,i}) W_{t,2} S_2 + Z_{r,2},$$

where $S_1$ and $S_2$ are transmitted communication signals and $Z_{r,1}$ and $Z_{r,2}$ are noise samples at the sensing receiver when the first and second transmit precoder matrices $W_{t,1}$ and $W_{t,2}$ are used, respectively. It may be assumed that transmissions with the first and second transmit precoder matrices $W_{t,1}$ and $W_{t,2}$ are performed in a short enough time interval so that AoDs $(\varphi_{t,i})$, AoAs $(\varphi_{r,i})$, and path gains $(\alpha_i)$ remain the same. Using the determination that $$\mathbb{E}[S_1 S_1^H] = \mathbb{E}[S_2 S_2^H] = I_K, \mathbb{E}[Z_{r,1} Z_{r,1}^H] = \mathbb{E}[Z_{r,1} Z_{r,2}^H] = \sigma_r^2 J_{N_r}, \text{ provides:}$$

$$R_{y,1} = \mathbb{E}[Y_{r,1} Y_{r,1}^H] = A R_1 A^H + \sigma_r^2 J_{N_r},$$

$$R_{y,2} = \mathbb{E}[Y_{r,2} Y_{r,2}^H] = A R_2 A^H + \sigma_r^2 J_{N_r},$$

where $$R_1 = W_{t,1} W_{t,1}^H, R_2 = W_{t,2} W_{t,2}^H, A = \sum_{i=0}^{L} A_i, A_i = \alpha_i a_r^*(\varphi_{r,i}) a_t^H(\varphi_{t,i}), \forall i.$$

$R_{y,1}$ and $R_{y,2}$ are received signal autocorrelation matrices calculated at the sensing receiver when the first and second transmit precoder matrices $W_{t,1}$ and $W_{t,2}$ are used, respectively. When the transmitter base station precoder is designed with the SABN operation, signals in a direction of a target AoD are cancelled:

$$a_t^H(\varphi_{t,i}) W_{t,2} \approx 0, \forall i \in \mathcal{S},$$

where $\mathcal{S}$ is the set of indices of targets whose AoDs are in the transmit target angular region $[\varphi_1, \varphi_2]$. Accordingly, $$\sum_{i \in \mathcal{S}} A_i R_2 \approx 0.$$

Hence, it is determined that $$R_{y,1} - R_{y,2} = \left(\sum_{i \in \mathcal{S}} A_i + \sum_{i \notin \mathcal{S}} A_i\right)(R_1 - R_2) A^H \approx \left(\sum_{i \in \mathcal{S}} A_i\right) R_1 A^H +$$

$$\left(\sum_{i \notin \mathcal{S}} A_i\right)(R_1 - R_2) A^H.$$

It may be assumed that the first transmit precoder matrix $W_{t,1}$ keeps the signal power outside the target direction region at levels similar to those achieved by the second transmit precoder matrix $W_{t,2}$ in order to obtain a similar communication performance. Hence, it may be determined that $$\left(\sum_{i \notin \mathcal{S}} A_i\right) R_1 \left(\sum_{i \notin \mathcal{S}} A_i\right)^H \approx \left(\sum_{i \notin \mathcal{S}} A_i\right) R_2 \left(\sum_{i \notin \mathcal{S}} A_i\right)^H.$$

As a result, it is found that $$R_{y,1} - R_{y,2} \approx \left(\sum_{i\in S} A_i\right)R_1 A^H + \left(\sum_{i\notin S} A_i\right)(R_1 - R_2)\left(\sum_{i\in S} A_i\right)^H \approx \left(\sum_{i\in S} A_i\right)$$

$$R_1\left(\sum_{i\in S} A_i\right)^H + \left(\sum_{i\in S} A_i\right)R_1\left(\sum_{i\notin S} A_i\right)^H + \left(\sum_{i\notin S} A_i\right)R_1\left(\sum_{i\in S} A_i\right)^H.$$

A rank of a matrix $\sum_{i\in S} A_i$ is at most $|S|$ as it is a sum of $|S|$ rank-1 matrices. Assuming that the antenna array geometry at the sensing receiver is adjusted properly and the target AoAs are not very close to each other, the subspaces generated by array steering vectors of the target AoAs (and the LoS path) become independent and the rank of $\sum_{i\in S} A_i$ becomes exactly $|S|$. The rank of the matrices ($\sum_{i\in S} A_i)R_1($ $\sum_{i\in S} A_i)^H$, ($\sum_{i\in S} A_i)R_1(\sum_{i\notin S} A_i)^H$ and ($\sum_{i\notin S} A_i)R_1($ $\sum_{i\in S} A_i)^H$ may be equal to $|S|$. Therefore, there exists a full rank matrix $T \in \mathbb{C}^{N_t \times |S|}$ satisfying $$\left(\sum_{i\in S} A_i\right)R_1\left(\sum_{i\in S} A_i\right)^H = \left(\sum_{i\in S} A_i\right)TT^H\left(\sum_{i\in S} A_i\right)^H$$

$$\left(\sum_{i\in S} A_i\right)R_1\left(\sum_{i\notin S} A_i\right)^H = \left(\sum_{i\in S} A_i\right)TT^H\left(\sum_{i\notin S} A_i\right)^H$$

$$\left(\sum_{i\notin S} A_i\right)R_1\left(\sum_{i\in S} A_i\right)^H = \left(\sum_{i\notin S} A_i\right)TT^H\left(\sum_{i\in S} A_i\right)^H.$$

The sensing receiver may utilize a proposition: Let $U \in (\mathbb{C}^{N\times M}$ and $V \in \mathbb{C}^{N\times M}$ be two matrices with $N \geq 2M$ and let $UU^H + UV^H + VU^H = E\Lambda E^H$ be an eigenvalue decomposition where $E=[e_1\ e_2\ \ldots\ e_N]$ is the matrix of eigenvectors and $\Lambda = \text{diag}(\lambda_1, \lambda_2, \ldots, \lambda_N)$ is the matrix of eigenvalues with $\lambda_1 \geq \lambda_2 \geq \ldots \geq \lambda_N$. Then it may be determined that $$\lambda_1 \geq \lambda_2 \geq \ldots \geq \lambda_M \geq \lambda_{M+1} =$$

$$\lambda_{M+2} = \ldots = \lambda_{N-M} = 0 \geq \lambda_{N-M+1} \geq \lambda_{N-M+2} \geq \ldots \geq \lambda_N.$$

It may further be determined that $$U^H e_i e_i^H U = V^H e_i e_i^H V = 0, i = M+1, M+2, \ldots, N-M,$$

$$U^H e_i e_i^H U \leq V^H e_i e_i^H V, i = N-M+1, N-M+2, \ldots, N.$$

The proposition can be proven using linear algebra techniques.

Let $U=(\sum_{i\in S} A_i)T$ and $V=(\sum_{i\notin S} A_i)T$ and the eigenvalue decomposition of $R_{y,1}-R_{y,2}\approx UU^H+UV^H+VU^H$ be $E\Lambda E^H$ where $E=[e_1\ e_2\ \ldots\ e_{N_r}]$ is the matrix of eigenvectors and $\Lambda = \text{diag}(\lambda_1, \lambda_2, \ldots, \lambda_{N_r})$ is the matrix of eigenvalues with $\lambda_1 \geq \lambda_2 \geq \ldots \geq \lambda_{N_r}$. Using the proposition, it is determined that $$U^H e_i e_i^H U = V^H e_i e_i^H V = 0, |S|+1 \leq i \leq N_r - |S|,$$

$$U^H e_i e_i^H U \leq V^H e_i e_i^H V, N_r - |S|+1 \leq i \leq N_r.$$

It may be determined that $$U^H e_i e_i^H U = T^H\left(\sum_{i\in S} A_i\right)^H e_j e_j^H\left(\sum_{i\in S} A_i\right)T$$

$$= T^H\left(\sum_{i\in S} \alpha_i a_r^*(\varphi_{r,i}) a_t^H(\varphi_{t,i})\right)^H e_j e_j^H\left(\sum_{i\in S} \alpha_i a_r^*(\varphi_{r,i}) a_t^H(\varphi_{t,i})\right)T.$$

where $T^H a_r(\varphi_{t,i})\neq 0$ for $i \in S$ as the transmit precoding maximizes the beam pattern gain for targets inside the transmit target angular region (i$\in S$). As a result, it may be determined that $a_r^T(\varphi_{r,i})e_j e_j^H a_r^*(\varphi_{r,i})=0$ for all $|S|+1\leq j\leq N_r-|S|$ and $i \in S$. As $V^H e_i e_i^H V=0$ is also satisfied, the same result is true for $i\notin S$, i.e., $a_r^T(\varphi_{r,i})e_j e_j^H a_r^*(\varphi_{r,i})=0$ for all $|S|+1\leq j\leq N_r-|S|$ and $i\notin S$.

In terms of AoA estimation, checking the peaks of $$f(\varphi) = \frac{1}{a_r^T(\varphi)e_j e_j^H a_r^*(\varphi)} \quad \text{for } |S|+1 \leq j \leq N_r - |S|$$

may provide AoA estimates of all targets. However, it would not be possible to detect AoDs of targets as the AoAs to be found are not only related to i$\in S$ but also related to i$\notin S$. To solve this problem, eigenvectors related to negative eigenvalues may be used, i.e., $e_j$ for $N_r-|S|+1\leq j\leq N_r$. As shown by the proposition, $U^H e_j e_j^H U \leq V^H e_j e_j^H V$ for $N_r-|S|+1\leq j\leq N_r$. Therefore, in the function $$\frac{1}{a_r^T(\varphi)e_j e_j^H a_r^*(\varphi)},$$

the peaks related to AoAs for i$\in S$ will be larger compared to the peaks related to AoAs for i$\notin S$. As a result, it becomes possible to distinguish the AoAs for the target transmit sensing beam pattern and hence the (AoD, AoA) pairs can be found.

An angular spectrum $$f(\varphi) = \frac{1}{a_r^T(\varphi)e_j e_j^H a_r^*(\varphi)} \quad \text{for } |S|+1 \leq j \leq N_r - |S|$$

provides strong peaks only at target AoAs whose AoDs are inside the target angular region of a transmit sensing beam. In other words, even if there are four targets with different AoA values and a LoS path at AoA with 90°, a resulting angular spectrum only has a single peak for each transmit target angular region. Using a projection onto eigenvectors with negative eigenvalues support to suppress peaks at target AoAs whose AoDs are outside the transmit target angular region of interest. Thus, the proposition enables the sensing receiver to accurately detect (AoD, AoA) pairs of all targets.

The sensing receiver may utilize the following operations to detect AoD and AoA pairs for a given transmit target angular region [$\varphi_r-\delta/2, \varphi_r+\delta/2$] (e.g., a region to be used for transmit precoding design). The sensing receiver may evaluate the eigenvalue decomposition of difference of autocorrelation matrices $\Delta R_y = R_{y,1} - R_{y,2}$, and may estimate the total number $i_0$ of positive eigenvalues of $\Delta R_y$. The eigenvalues of $\Delta R_y$ may be $\lambda_1 \geq \lambda_2 \geq \ldots \geq \lambda_{N_r}$. As one of the detection methods, the sensing receiver may find a largest i with $1\leq i\leq N_r/2$ satisfying $$\lambda_i > \eta_1 \left| \sum_{j=i}^{N_r} \lambda_j \right|$$

for a pre-determined threshold value $\eta_1$ to estimate $i_0$. The sensing receiver may form the matrix of eigenvectors $G=[e_{i_0+1} \ e_{i_0+2} \ \ldots \ e_{N_r}]$ corresponding to the eigenvalues $0 \geq \lambda_{i_0+1} \geq \lambda_{i_0+2} \geq \ldots \geq \lambda_{N_r}$. The sensing receiver may calculate the angular spectrum $$f(\varphi) = \frac{1}{a_r^T(\varphi) GG^H a_r^*(\varphi)}$$

for all potential AoAs and may identify the $i_0$ largest peaks of $f(\varphi)$. To avoid overestimating the correct number of peaks, the sensing receiver may also compare the peak values with a pre-determined threshold, i.e., choose a peak at the angle $\varphi_{r,i}$ only if $f(\varphi_{r,i}) > \eta_2$. After the peak detection, a number ($L_0 \leq i_0$) of AoA angles $\{\varphi_{r,i}\}_{i=1}^{L_0}$ may be detected by the sensing receiver. For each AoA detected, the corresponding AoD is $\varphi_t$ as the transmit precoding maximizes the signal power at that angle with the SABF operation. In other words, the AoD and AoA pairs detected are $\{(\varphi_{t,i}, \varphi_{r,i})\}_{i=1}^{L_0}$, where $\varphi_{t,i} = \varphi_t$ for all $i=1, 2, \ldots, L_0$. Using the eigenvalues $\lambda_i$ of $\Delta R_y$ and the peak values $f(\varphi_{r,i})$, the sensing receiver may assign a weight to each detected AoD and AoA pair. There can be different options for weight assignment. One example method may include assigning $\lambda_i$ to the pair $(\varphi_{t,i}, \varphi_{r,i})$ for all $i=1, 2, \ldots, L_0$. As another option, a weighted sum of $\lambda_i$ and $f(\varphi_{r,i})$ may be utilized to determine a weight $w_i$ for the pair $(\varphi_{t,i}, \varphi_{r,i})$.

Figure 1E:
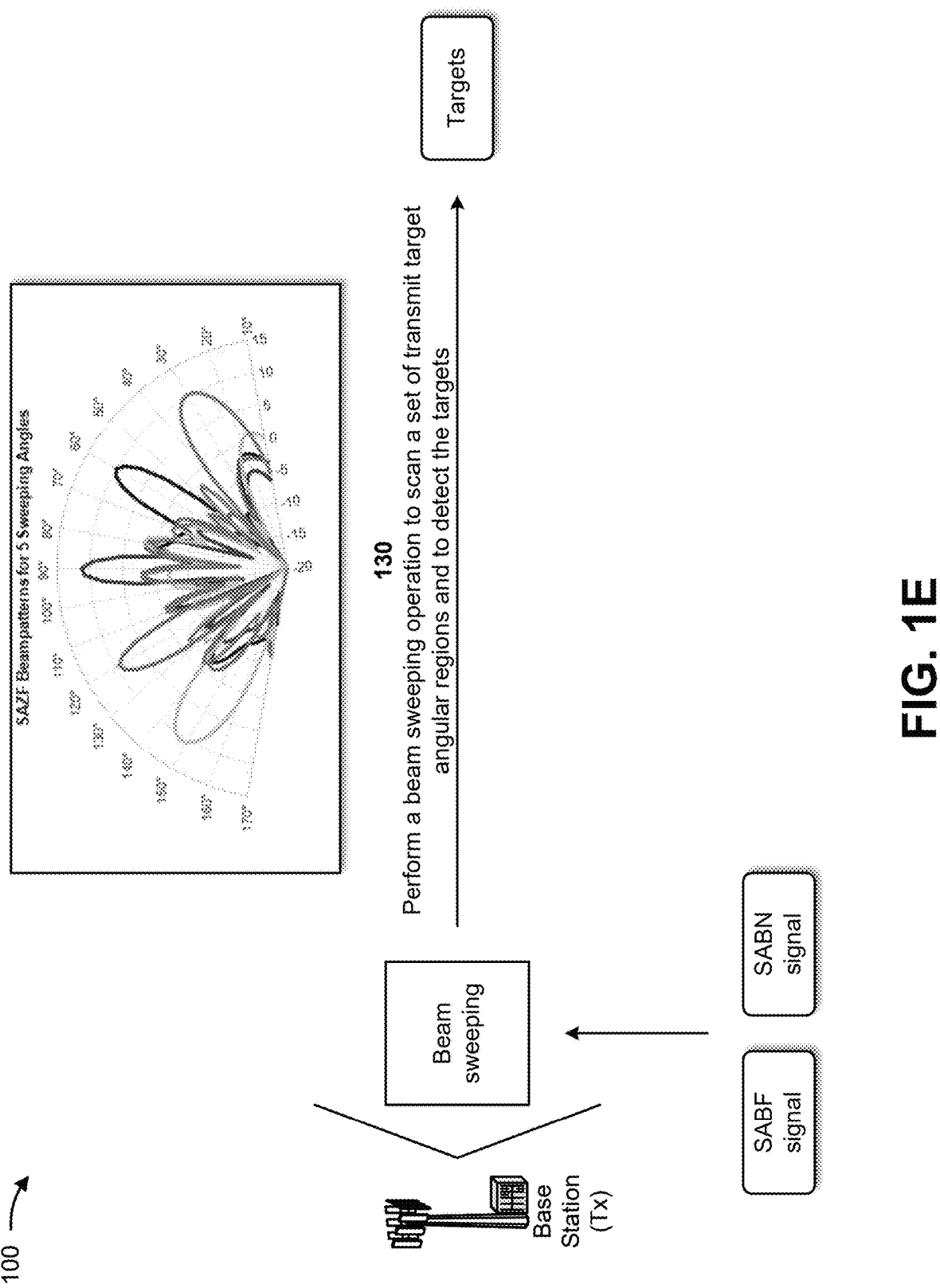

As shown in FIG. 1E, and by reference number 130, the transmitter base station may perform a beam sweeping operation to scan a set of transmit angular regions and to detect the targets. For example, to detect all targets and their AoD and AoA pairs, a beam sweeping operation can be performed at the transmitter base station. Depending on the number of antennas $N_t$ at the transmitter base station, the width of the transmit target angular region can be determined and a suitable resolution for beam sweeping may be performed. For example, for $N_t=16$, the beam sweeping can be performed with 5° resolution. As beam sweeping is performed, a transmit beam pattern changes accordingly with a high gain at a desired angle, and there are side lobes for each sweeping angle that are used to maintain good communication quality for UEs. For each angle swept, the transmit precoding (e.g., with the SABF and SABN operations) and a receive an algorithm to detect (AoD, AoA, weight) triples may be performed. Pre-defined transmit target angular regions (e.g., regions centered at angles 10°, 15°, . . . , 170° each with 5° width) can be swept to detect the (AoD, AoA, weight) triples for all targets. A total number of beam sweeping stages (e.g., the number of transmit target angular regions) may be determined.

Figure 1F:
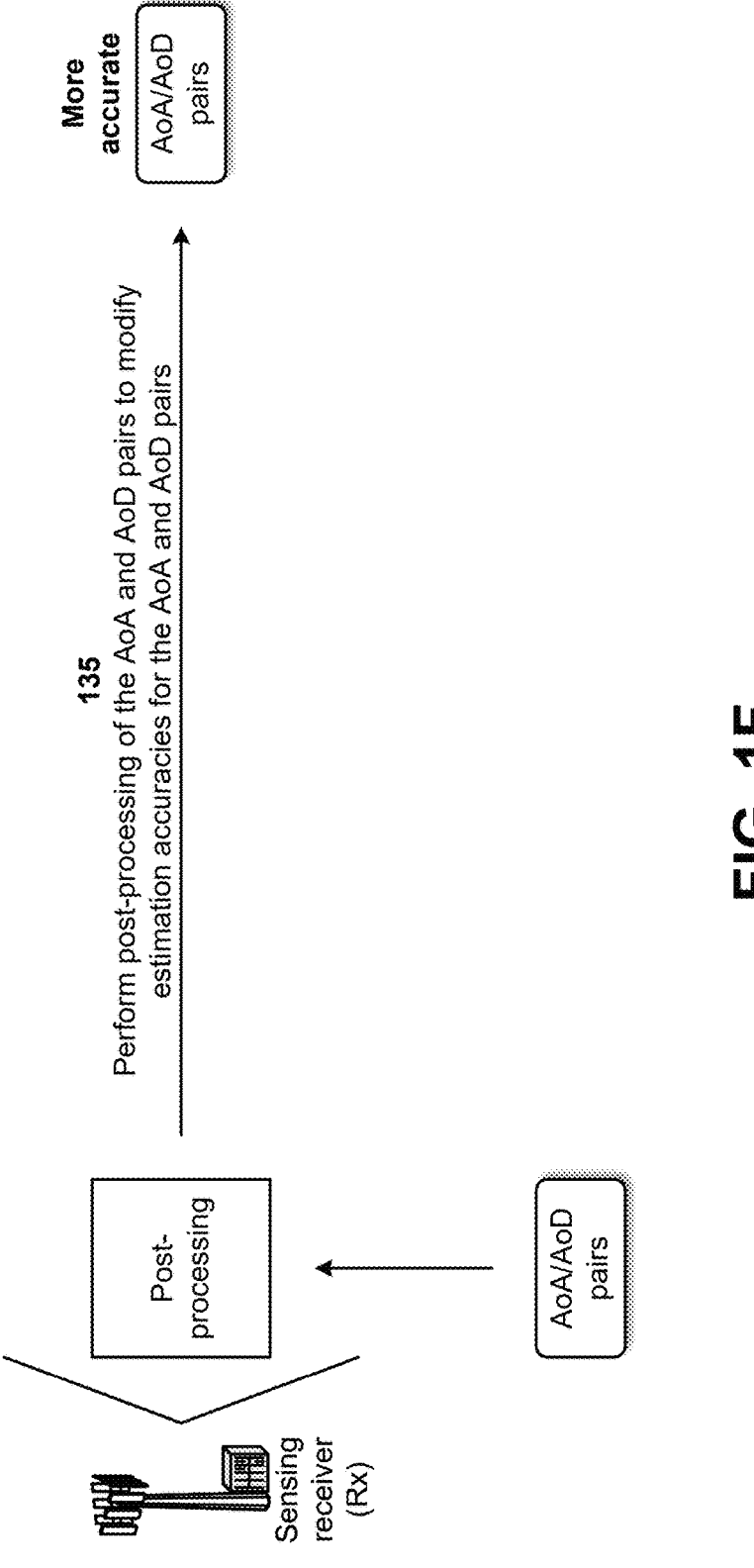

As shown in FIG. 1F, and by reference number 135, the sensing receiver may perform post-processing of the AoA and AoD pairs to modify estimation accuracies for the AoA and AoD pairs. For example, after determining the AoD and AoA values of each target, the sensing receiver may perform post-processing to obtain more accurate results. For example, the sensing receiver may perform outlier elimination, elimination of the LoS path, merging of targets with close AoD and AoA information, and/or the like. For outlier elimination, the sensing receiver may calculate rays (e.g., defined by AoDs and AoAs) with starting points at either the transmitter base station (for AoDs) or the sensing receiver (for AoAs). If the two rays for a target do not intersect, then the corresponding pair can be marked as an outlier (e.g., false detection) and can be removed. In some cases, especially when it is very strong compared to other reflected paths, the LoS path can be detected as a target path. In such cases, using the AoD and AoA information about the LoS path, the sensing receiver may remove the paths (e.g., associated with AoD and AoA pairs) close to the LoS path.

In some scenarios, a single target can be detected as multiple targets with close AoD and AoA information. In such scenarios, the sensing receiver may utilize a clustering method (e.g., k-means clustering) to cluster targets with close enough AoD and AoA information. When merging multiple targets, assigned weights can be used to determine a final AoD and AoA pair. In one example, a weighted sum of close AoD and AoA angles can be calculated to determine an angle value after merging. The merging operation may be needed when there is a target in the middle of two neighbor transmit target angular regions. For example, assume that beam sweeping is performed at AoDs 10°, 15°, . . . , 170° with a 5° beamwidth and there is a target with an AoD at 32.5°. In this case, the same target can be detected in transmit target angular regions centered at 30° and 35°. Using the weights calculated in these two cases, merging can be performed and an AoD estimation can be accurately determined.

Figure 1G:
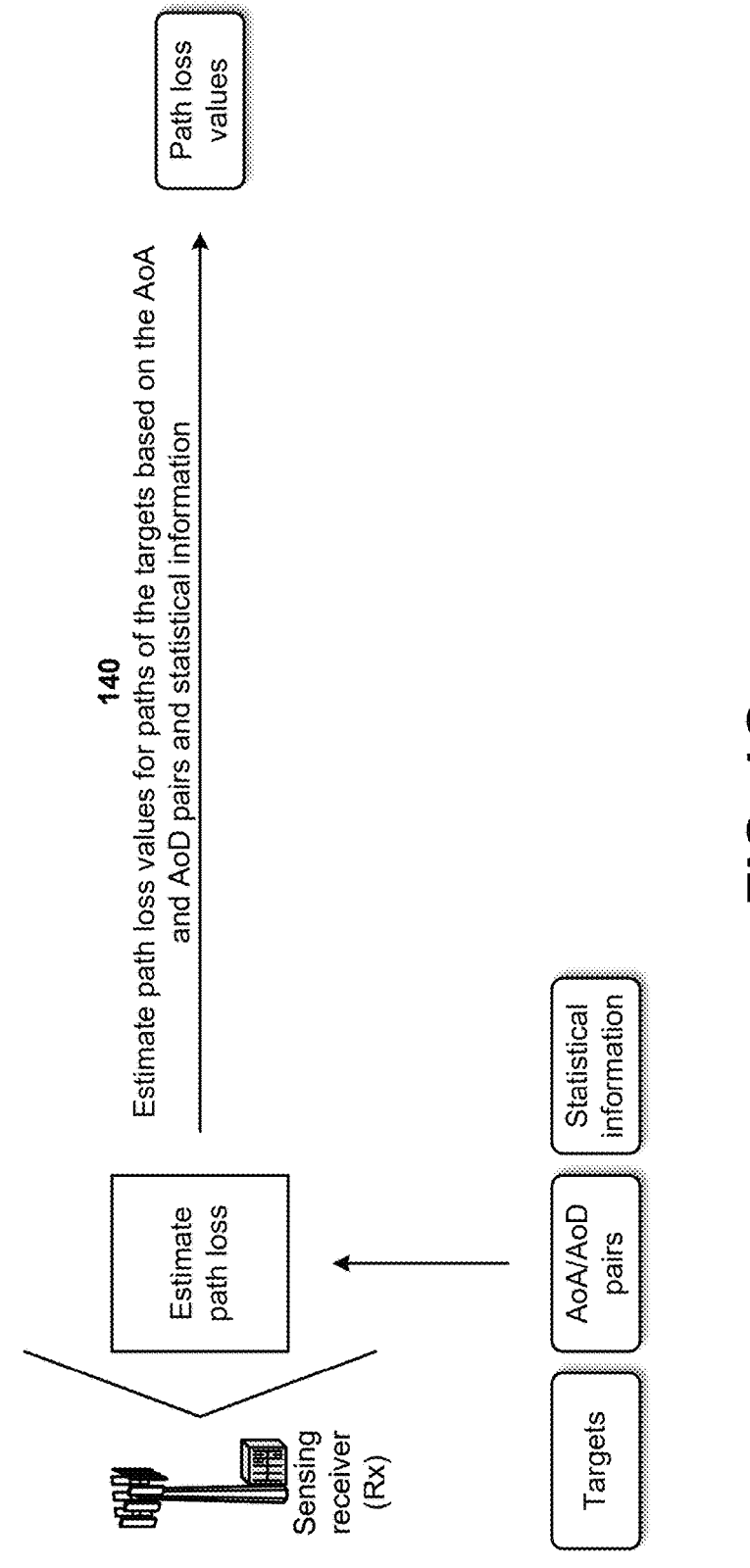

As shown in FIG. 1G, and by reference number 140, the sensing receiver may estimate path loss values for paths of the targets based on the AoA and AoD pairs. For example, to have information about RCS values of each target, a path loss for each target reflection path can be estimated by the sensing receiver. The estimation of path loss values can be performed by estimating $\alpha_i$ for all $i=0, 1, 2, \ldots, L$. At each beam sweeping stage, the difference of autocorrelation matrices can be written as $$\Delta R_{y,b} = A \Delta R_b A^H, \ b=1,2, \ldots, B$$

where $\Delta R_{y,b}$ is the difference of autocorrelation matrices obtained at the b-th beam sweeping stage, and $\Delta R_b = W_{t,1,b} W_{t,1,b}^H - W_{t,2,b} W_{t,2,b}^H$ is the difference of transmit signal autocorrelation matrices for the b-th beam sweeping stage. The last equation can be written as $$\Delta R_{y,b} = \left( \sum_{i=0}^{L} \alpha_i a_r^*(\varphi_{r,i}) a_t^H(\varphi_{t,i}) \right) \Delta R_b \left( \sum_{j=0}^{L} \alpha_j a_r^*(\varphi_{r,j}) a_t^H(\varphi_{t,j}) \right)^H$$

$$= \sum_{i=0}^{L} \sum_{j=0}^{L} \alpha_i \alpha_j^* a_r^*(\varphi_{r,i}) a_t^H(\varphi_{t,i}) \Delta R_b a_t(\varphi_{t,j}) a_r^T(\varphi_{r,j}).$$

Therefore, it is determined that $$vec(\Delta R_{y,b}) = \sum_{i=0}^{L} \sum_{j=0}^{L} \alpha_i \alpha_j^* vec\left( a_r^*(\varphi_{r,i}) a_t^H(\varphi_{t,i}) \Delta R_b a_t(\varphi_{t,j}) a_r^T(\varphi_{r,j}) \right).$$

If $\alpha = [\alpha_0 \ \alpha_1 \ \ldots \ \alpha_L]^T$, $A_{eq} \in \mathbb{C}^{N_r^2 B \times (L+1)^2}$ and $b_{eq} \in \mathbb{C}^{N_r^2 B \times 1}$ satisfying $$[A_{eq}]_{(b-1)N_r^2+k, \ i(L+1)+j+1} = \left[ vec\left( a_r^*(\varphi_{r,j}) a_t^H(\varphi_{t,j}) \Delta R_b a_t(\varphi_{t,i}) a_r^T(\varphi_{r,i}) \right) \right]_k$$

-continued for all $k = 1, 2, \ldots, N_r^2, b = 1, 2, \ldots, B,$ $i = 0, 1, 2, \ldots, L, j = 0, 1, 2, \ldots, L$ and $[b_{eq}]_{(b-1)N_r^2+k} = [vec(\Delta R_{y,b})]_k$ for all $k = 1, 2, \ldots, N_r^2, b = 1, 2, \ldots, B.$ Then it may be determined that $$A_{eq}vec(\alpha\alpha^H)=b_{eq}.$$

Once the AoD and AoA values are estimated, and the difference of transmit autocorrelation matrices $\Delta R_b$ is known by the sensing receiver, the matrix $A_{eq}$ and the vector $b_{eq}$ can be calculated by the sensing receiver. The AoD and AoA estimation is performed at the sensing receiver and $\Delta R_b$ may include statistical (e.g., not rapidly changing) information of the transmitted signal by transmitter base station and hence can be delivered to the sensing receiver via a dedicated link (e.g., such as via a transport network or the core network). The transfer of $\Delta R_b$ from transmitter base station to sensing receiver may be accomplished in several ways. For example, the entries of $\Delta R_b$ may be transferred directly. Since the matrix is complex and Hermitian with $N_t^2$ entries, only the diagonal elements ($N_t$ real numbers) and lower (or upper) diagonal elements ($(N_t^2-N_t)/2$ complex numbers) need to be transferred. This process may transfer $N_t^2$ real numbers. If the information is to be submitted for different sub bands, then the total number may be multiplied by the number of sub bands. In other example, partial information about $\Delta R_b$ may be transferred. In some cases where the structure of $\Delta R_b$ known by the receiving base station, only the partial information need be transmitted.

To find a solution of the equation $A_{eq}vec(\alpha\alpha^H)=b_{eq}$, the sensing receiver may find a least-squares solution of $A_{eq}x=b_{eq}$ as $x=A_{eq}^\dagger b_{eq}$, and may form the square matrix $\beta$ using x so that $[\beta]_{i+1,j+1}=[x]_{j(L+1)+i+1}$ for all $i=0, 1, \ldots, L$ and $j=0, 1, \ldots, L$. The sensing receiver may determine a rank-1 estimate of $\beta$ using its principal eigenvalue $\lambda$ and eigenvector e, $\hat{\alpha}=\sqrt{\lambda}e$, where a final estimate of $\alpha$ is $\hat{\alpha}$.

As shown in FIG. 1H, and by reference number 145, the sensing receiver may determine positions of the targets based on the AoA and AoD pairs. For example, in a bistatic setup, once the AoDs and AoAs of the targets are estimated, the sensing receiver may calculate positions of the targets using triangulation technique by intersecting related rays. The ray equations can be calculated in two-dimensional coordinate system as $$(y_i - y_t) \cos \varphi_{t,i} = (x_i - x_t) \sin \varphi_{t,i}, i = 1, 2, \ldots, L,$$

$$(y_i - y_r) \cos \varphi_{r,i} = (x_i - x_r) \sin \varphi_{r,i}, i = 1, 2, \ldots, L,$$

where the transmitter base station and the sensing receiver has coordinates $(x_t, y_t)$ and $(x_r, y_r)$, respectively, and the i-th target has coordinates $(x_i, y_i)$. It may be determined that $$\begin{pmatrix} -\sin \varphi_{t,i} & \cos \varphi_{t,i} \\ -\sin \varphi_{r,i} & \cos \varphi_{r,i} \end{pmatrix}\begin{pmatrix} x_i \\ y_i \end{pmatrix} = \begin{pmatrix} y_t \cos \varphi_{t,i} - x_t \sin \varphi_{t,i} \\ y_r \cos \varphi_{r,i} - x_r \sin \varphi_{r,i} \end{pmatrix}.$$

The solution position may be determined as $$\begin{pmatrix} x_i \\ y_i \end{pmatrix} = \frac{1}{\sin(\varphi_{r,i} - \varphi_{t,i})}\begin{pmatrix} -\cos \varphi_{r,i} & -\cos \varphi_{t,i} \\ \sin \varphi_{r,i} & -\sin \varphi_{t,i} \end{pmatrix}\begin{pmatrix} y_t \cos \varphi_{t,i} - x_t \sin \varphi_{t,i} \\ y_r \cos \varphi_{r,i} - x_r \sin \varphi_{r,i} \end{pmatrix}.$$

-continued

If $\sin(\varphi_{r,i} - \varphi_{t,i}) = 0,$ the two rays do not intersect. Such a case should not happen since the outlier elimination process may remove such AoD and AoA pairs as described above. The method described may consider two dimensions (e.g., height information may not be included) and may omit curvature of the earth. However, the sensing receiver may generalize the method by defining rays on the earth's surface in three dimensions. This may be beneficial when elevation angle information is also available (e.g., using an antenna array different than ULA) and a distance between the transmitter base station and the sensing receiver is large.

As further shown in FIG. 1H, and by reference number 150, the sensing receiver may perform one or more actions based on the positions of the targets. For example, the sensing receiver may perform traffic monitoring based on the positions of the targets, may identify parking spots in busy city streets based on the positions of the targets, may detect pedestrians crossing streets based on the positions of the targets, may count a number of people within a local area based on the positions of the targets, may detect unidentified drones or other flying objects based on the positions of the targets, may detect a presence of people within geo-fenced areas of a factory based on the positions of the targets, may provide accurate localization and tracking of large passive objects in a factory based on the positions of the targets, may provide collision avoidance between autonomous vehicles or other mobile robots and people based on the positions of the targets, and/or the like.

Figure 1I:
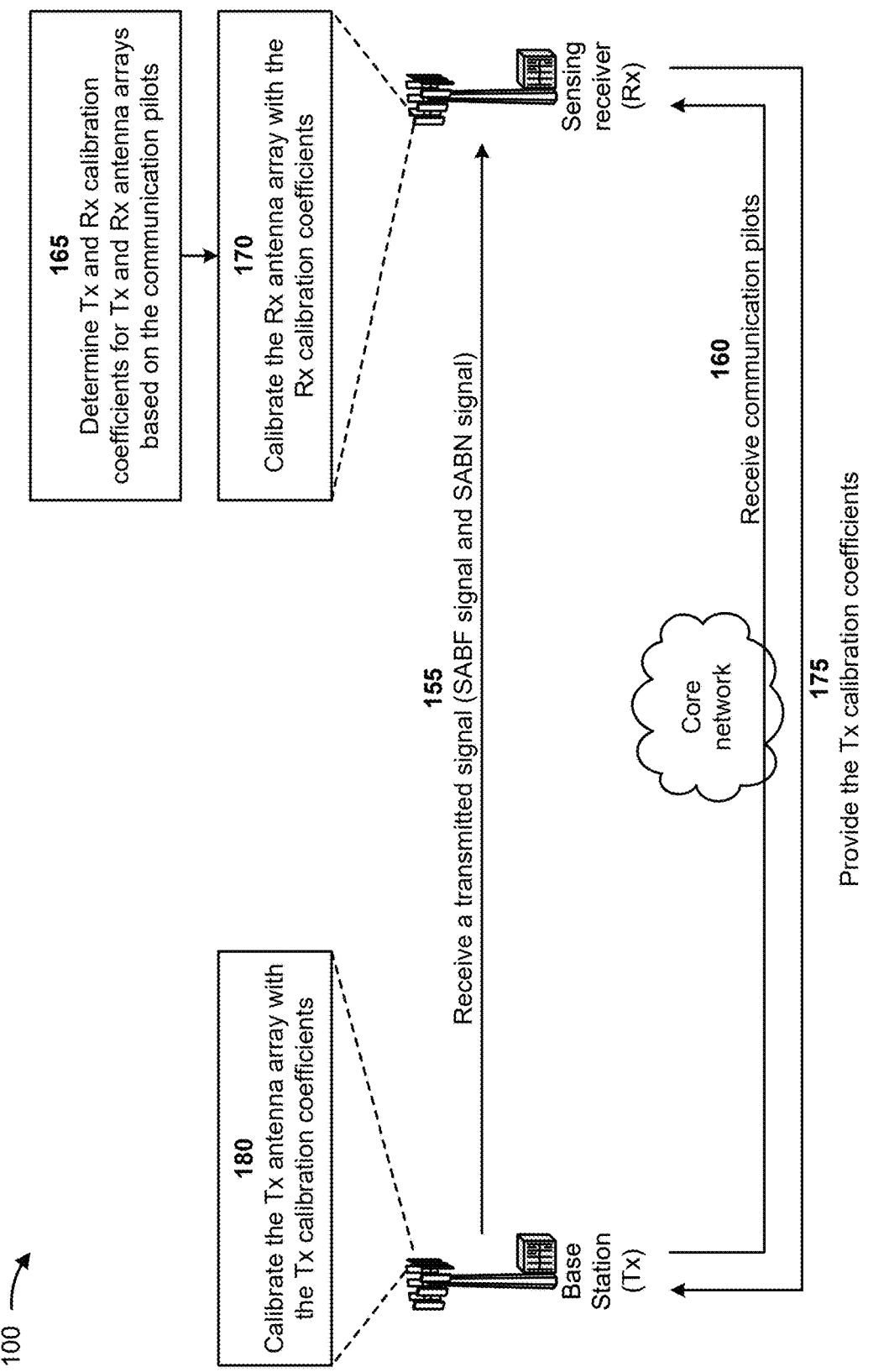

As shown in FIG. 1I, and by reference number 155, the sensing receiver may receive a transmitted signal (e.g., the SABF signal and the SABN signal). For example, in some scenarios, due to hardware impairments and mutual coupling, there may be unwanted phase/gain misalignments between antenna array elements of the transmitter base station and/or the sensing receiver. The LoS path between the transmitter base station and the sensing receiver may be utilized for calibration that eliminates the phase/gain misalignments. A principal subspace of a measured channel between the transmitter base station and the sensing receiver can be compared with an ideal LoS channel (e.g., calculated using ideal transmit and receiver array steering vectors) to jointly calibrate the antenna arrays of the transmitter base station and the sensing receiver. In some implementations, the sensing receiver may utilize communication pilot symbols (e.g., provided in the SABF signal and/or the SABN signal) to estimate a channel $H_0$ between the transmitter base station and the sensing receiver.

As further shown in FIG. 1I, and by reference number 160, the sensing receiver may receive communication pilots from the transmitter base station. For example, the sensing receiver may receive, via the core network, the communication pilots (e.g., demodulation reference signals) from the transmitter base station. In some implementations, the communication pilots may include information about the difference of the transmit autocorrelation matrices $\Delta R_b$, described above.

As further shown in FIG. 1I, and by reference number 165, the sensing receiver may determine transmitter and receiver calibration coefficients for transmitter and receiver antenna arrays based on the communication pilots. For example, the channel matrix $H_0$ may include both the LoS path and the target reflection paths. To extract the LoS path component, the sensing receiver may evaluate a singular value decomposition of $H_0$:

$$H_0 = U_{H,0} S_{H,0} V_{H,0}{}^H$$

where diagonal elements of $S_{H,0}$ are sorted in descending order. The sensing receiver may calculate the vectors $h_{r,0}$ and $h_{t,0}$ as the first columns of $U_{H,0}$ and $V_{H,0}$, respectively. The sensing receiver may calculate ideal transmit and receiver array steering vectors $a_{t,0}(\varphi_{t,0})$ and $a_{r,0}(\varphi_{r,0})$ using the AoD ($\varphi_{t,0}$) and AoA ($\varphi_{r,0}$) for the LoS path between the transmitter base station and the sensing receiver. The sensing receiver may calculate calibration vectors $c_t \in \mathbb{C}^{N_t \times 1}$ for transmitter arrays and $c_r \in \mathbb{C}^{N_r \times 1}$ for receiver arrays by element-wise division operations:

$$[c_t]_i = \frac{\sqrt{N_t} \, [h_{t,0}]_i}{[a_{t,0}(\varphi_{t,0})]_i}, \; i = 1, 2, \ldots, N_t, \; [c_r]_i = \frac{\sqrt{N_r} \, [h_{r,0}]_i^*}{[a_{r,0}(\varphi_{r,0})]_i}, \; i = 1, 2, \ldots, N_r.$$

The calibration vectors may correspond to the calibration coefficients for the transmitter and receiver antenna arrays.

As further shown in FIG. 1I, and by reference number 170, the sensing receiver may calibrate the receiver antenna array with the receiver calibration coefficients. For example, the sensing receiver may utilize the calibration vectors to calibrate the receiver antenna array by element-wise multiplication of corresponding elements of the receiver array steering vector.

As further shown in FIG. 1I, and by reference number 175, the sensing receiver may provide the transmitter calibration coefficients to the transmitter base station. For example, the sensing receiver may provide the calibration coefficients (e.g., the calibration vectors used to calibrate the transmitter antenna array) to the transmitter base station via the core network (e.g., or via transport network).

As further shown in FIG. 1I, and by reference number 180, the transmitter base station may calibrate the transmitter antenna array with the transmitter calibration coefficients. For example, the transmitter base station may utilize the calibration vectors to calibrate the transmitter antenna array by element-wise multiplication of corresponding elements of the transmitter array steering vector.

In this way, the sensing receiver provides differential sensing for joint communications and sensing. For example, a transmitter base station of a JCAS system may utilize sweeping for transmitter sensing beams with sensing-aware beam-forming and beam-nulling operations. A sensing receiver of the JCAS system may apply an eigenspace analysis to a difference of autocorrelation matrices obtained from the sensing-aware beam-forming and beam-nulling operations. The sensing receiver may detect targets and may estimate an AoA and AoD pair for each detected target. The sensing receiver may perform a path loss estimation for each target path (e.g., which can be used to estimate RCS values), and may estimate a position of each detected target. The sensing receiver may also utilize communication pilots (e.g., demodulation reference signals), received from the transmitter base station, to calculate calibration coefficients for antenna arrays of the sensing receiver and the transmitter base station. Thus, the sensing receiver conserves computing resources, networking resources, and/or the like that would otherwise have been consumed by generating poor position estimates due to a limited number of estimated AoAs, generating poor position estimates due to the strong line-of-sight path between the JCAS transmitter and sensing receiver, decreasing resources for communications due to position estimating, performing incorrect actions based on poor position estimates, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
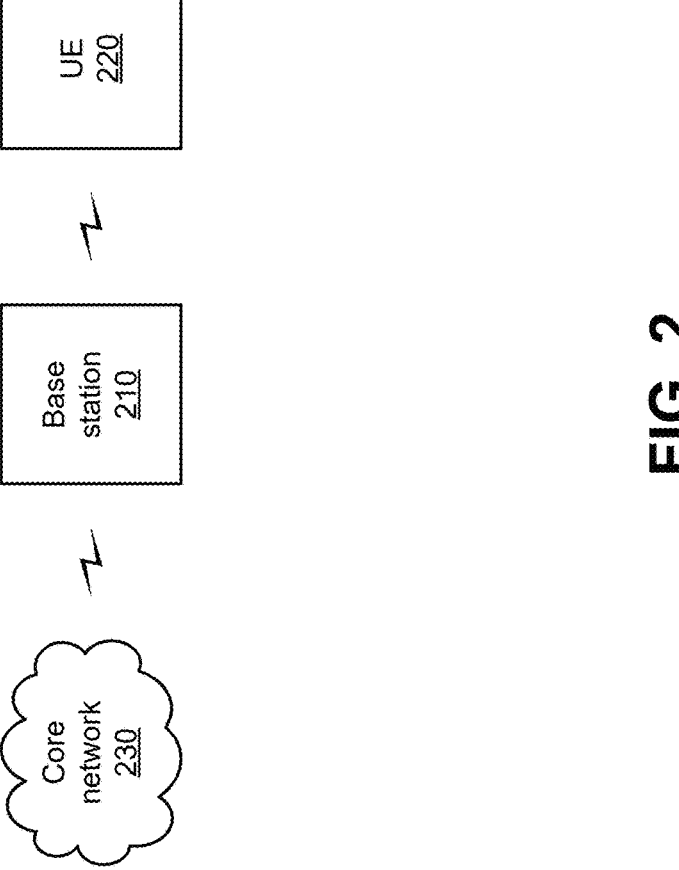
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a base station 210, a UE 220, and/or a core network 230. Devices and/or elements of the environment 200 may interconnect via wired connections and/or wireless connections.

The base station 210 may support, for example, a cellular radio access technology (RAT). The base station 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, micro-cell base stations, picocell base stations, femtocell base stations, or similar types of devices) and other network entities that can support wireless communication for a UE 220. The base station 210 may transfer traffic between a UE 220 (e.g., using a cellular RAT), one or more base stations (e.g., using a wireless interface or a backhaul interface, such as a wired backhaul interface), and/or a core network. The base station 210 may provide one or more cells that cover geographic areas.

In some implementations, the base station 210 may perform scheduling and/or resource management for a UE 220 covered by the base station 210 (e.g., a UE 220 covered by a cell provided by the base station 210). In some implementations, the base station 210 may be controlled or coordinated by a network controller, which may perform load balancing, network-level configuration, and/or other operations. The network controller may communicate with the base station 210 via a wireless or wireline backhaul. In some implementations, the base station 210 may include a network controller, a self-organizing network (SON) module or component, or a similar module or component. In other words, the base station 210 may perform network control, scheduling, and/or network management functions (e.g., for uplink, downlink, and/or sidelink communications of a UE 220 covered by the base station 210).

The UE 220 may include one or more devices capable of receiving, generating, storing, processing, and/or providing information, as described elsewhere herein. The UE 220 may include a communication device and/or a computing device. For example, the UE 220 may include a wireless communication device, a mobile phone, a user equipment, a laptop computer, a tablet computer, a desktop computer, a gaming console, a set-top box, a IoT device, a wearable communication device (e.g., a smart wristwatch, a pair of smart eyeglasses, a head mounted display, or a virtual reality headset), or a similar type of device.

The core network 230 may include one or more wired and/or wireless networks. For example, the core network 230 may include a cellular network (e.g., a sixth generation (6G) network, a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The core network 230 enables communication among the devices of the environment 200. In some implementations, the core network 230 may include an example architecture of a 5G next generation (NG) core network included in a 5G wireless telecommunications system, a 6G core network included in a 6G wireless telecommunications system, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
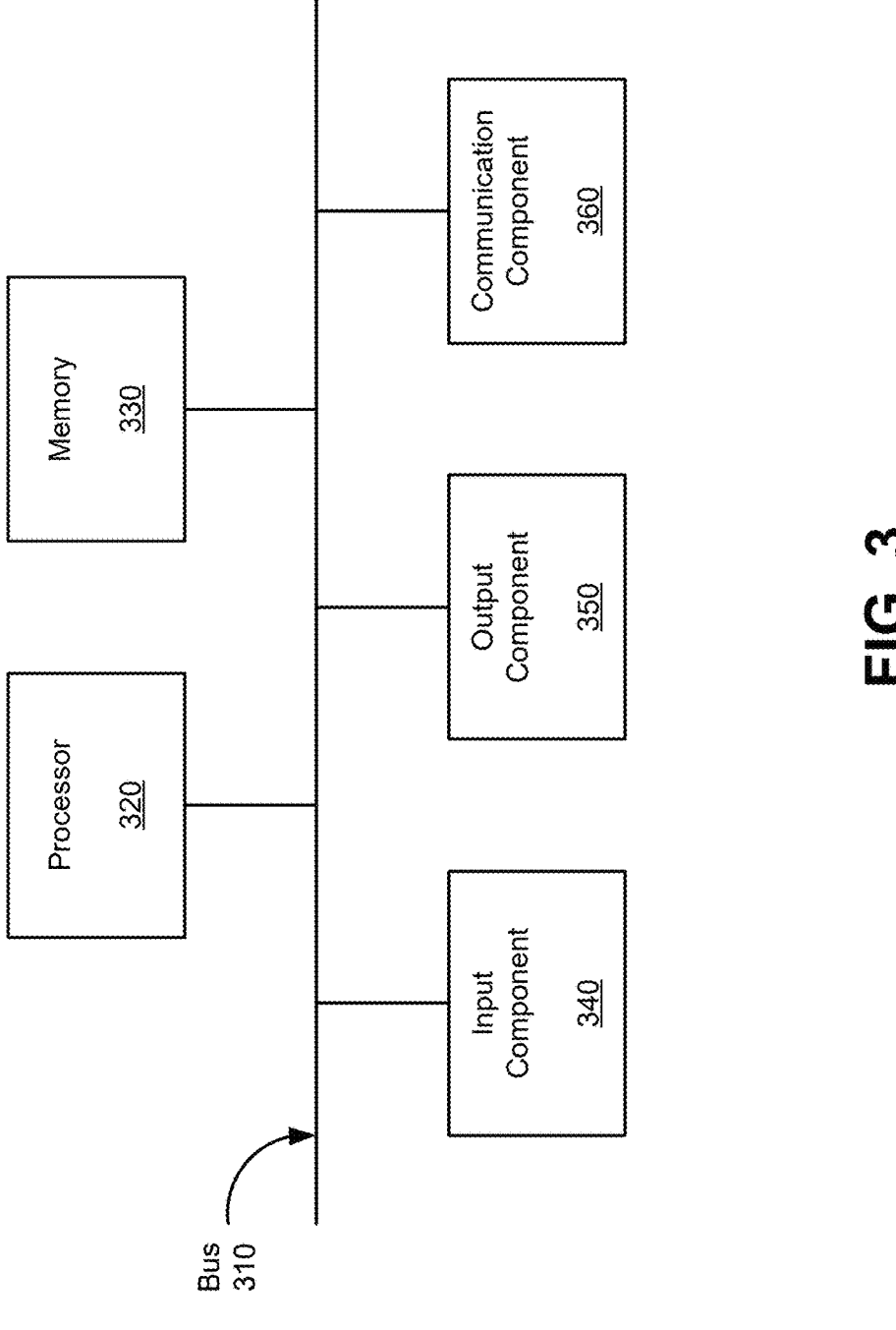
FIG. 3 is a diagram of example components of one or more devices of FIG. 2.

FIG. 3 is a diagram of example components of a device 300, which may correspond to the base station 210 and/or the UE 220. In some implementations, the base station 210 and/or the UE 220 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications)

related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for differential sensing for joint communications and sensing. In some implementations, one or more process blocks of FIG. 4 may be performed by a device (e.g., the base station 210). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include estimating targets and AoA and AoD pairs for the targets based on an SABF signal and an SABN signal received from another device (block 410). For example, the device may estimate targets and AoA and AoD pairs for the targets based on an SABF signal and an SABN signal received from another device, as described above. In some implementations, estimating the targets and the AoA and AoD pairs for the targets includes calculating an eigenvalue decomposition of difference of autocorrelation matrices based on the SABF signal and the SABN signal, estimating a total quantity of positive eigenvalues of the eigenvalue decomposition of difference, calculating angular spectrums for the AoAs based on the total quantity of positive eigenvalues, and estimating the AoA and AoD pairs based on the angular spectrums for the AoAs.

In some implementations, the SABF signal is generated based on a transmit precoder matrix that is determined based on an ideal sensing beam pattern that maximizes a signal power in a transmitter target angular region. In some implementations, the SABN signal is generated based on a transmit precoder matrix determined based on an ideal sensing beam pattern that minimizes a signal power in a transmit target angular region.

As further shown in FIG. 4, process 400 may include performing post-processing of the AoA and AoD pairs to modify estimation accuracies for the AoA and AoD pairs (block 420). For example, the device may perform post-processing of the AoA and AoD pairs to modify estimation accuracies for the AoA and AoD pairs, as described above. In some implementations, performing post-processing of the AoA and AoD pairs includes one or more of eliminating outliers for the AoA and AoD pairs to modify the estimation accuracies for the AoA and AoD pairs, eliminating a line-of-sight path for the AoA and AoD pairs to modify the estimation accuracies for the AoA and AoD pairs, or merging targets with substantially similar AoA and AoD pairs to modify the estimation accuracies for the AoA and AoD pairs.

As further shown in FIG. 4, process 400 may include estimating path loss values for paths of the targets (block 430). For example, the device may estimate path loss values for paths of the targets, as described above.

As further shown in FIG. 4, process 400 may include determining positions of the targets based on the AoA and AoD pairs (block 440). For example, the device may determine positions of the targets based on the AoA and AoD pairs, as described above. In some implementations, determining the positions of the targets based on the AoA and AoD pairs includes utilizing a triangulation technique to determine the positions of the targets based on the AoA and AoD pairs.

As further shown in FIG. 4, process 400 may include performing one or more actions based on the positions of the targets (block 450). For example, the device may perform one or more actions based on the positions of the targets, as described above. In some implementations, performing the one or more actions includes one or more of monitoring traffic based on the positions of the targets, identifying one or more parking spots based on the positions of the targets, detecting one or more vehicles based on the positions of the targets, or detecting one more pedestrians crossing one or more streets based on the positions of the targets.

In some implementations, performing the one or more actions includes one or more of counting a quantity of people within an area based on the positions of the targets, detecting one or more unidentified drones based on the positions of the targets, or detecting a presence of people within one or more geo-fenced areas of a factory based on the positions of the targets. In some implementations, performing the one or more actions includes one or more of tracking one or more moving objects in a factory based on the positions of the targets, or preventing collisions between one or more of autonomous vehicles, robots, or people.

In some implementations, process 400 includes receiving communication pilots, determining transmitter calibration coefficients for the other device and receiver calibration coefficients for the device based on the communication pilots, and calibrating a receiver antenna array of the device with the receiver calibration coefficients. In some implementations, process 400 includes providing the transmitter calibration coefficients to the other device to cause the other device to calibrate a transmitter antenna array of the other device with the transmitter calibration coefficients. In some implementations, the transmitter calibration coefficients and the receiver calibration coefficients are determined based on a line-of-sight path between a transmitter antenna array of the other device and the receiver antenna array. In some implementations, process 400 includes causing performance of a beam sweeping operation to scan a set of transmit target angular regions and to detect the targets.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
estimating, by a device, targets and angle-of-arrival (AoA) and angle-of-departure (AoD) pairs for the targets based on a sensing-aware beam-forming (SABF) signal and a sensing-aware beam-nulling (SABN) signal received from another device,
wherein estimating the targets and the AoA and AoD pairs for the targets comprises:
calculating an eigenvalue decomposition of difference of autocorrelation matrices based on the SABF signal and the SABN signal,
estimating a total quantity of positive eigenvalues of the eigenvalue decomposition of difference,
calculating angular spectrums for the AoAs based on the total quantity of positive eigenvalues, and
estimating the AoA and AoD pairs based on the angular spectrums for the AoAs;
performing, by the device, post-processing of the AoA and AoD pairs to modify estimation accuracies for the AoA and AoD pairs;
estimating, by the device, path loss values for paths of the targets;
determining, by the device, positions of the targets based on the AoA and AoD pairs; and
performing, by the device, one or more actions based on the positions of the targets.

2. The method of claim 1,
wherein performing, by the device, post-processing of the AoA and AoD pairs comprises one or more of:
eliminating outliers for the AoA and AoD pairs to modify the estimation accuracies for the AoA and AoD pairs;
eliminating a line-of-sight path for the AoA and AoD pairs to modify the estimation accuracies for the AoA and AoD pairs; or
merging targets with substantially similar AoA and AoD pairs to modify the estimation accuracies for the AoA and AoD pairs.

3. The method of claim 1,
wherein determining the positions of the targets based on the AoA and AoD pairs comprises:
utilizing a triangulation technique to determine the positions of the targets based on the AoA and AoD pairs.

4. The method of claim 1,
wherein performing the one or more actions comprises one or more of:
monitoring traffic based on the positions of the targets;
identifying one or more parking spots based on the positions of the targets;
detecting one or more vehicles based on the positions of the targets; or detecting one more pedestrians crossing one or more streets based on the positions of the targets.

5. The method of claim 1,
wherein performing the one or more actions comprises one or more of:
counting a quantity of people within an area based on the positions of the targets;
detecting one or more unidentified drones based on the positions of the targets; or
detecting a presence of people within one or more geo-fenced areas of a factory based on the positions of the targets.

6. The method of claim 1,
wherein performing the one or more actions comprises one or more of:
tracking one or more moving objects in a factory based on the positions of the targets; or
preventing collisions between one or more of autonomous vehicles, robots, or people.

7. A device, comprising:
one or more memories; and
one or more processors, coupled to the one or more memories, configured to:
estimate targets and angle-of-arrival (AoA) and angle-of-departure (AoD) pairs for the targets based on a sensing-aware beam-forming (SABF) signal and a sensing-aware beam-nulling (SABN) signal received from another device,
wherein, to estimate the targets and the AoA and AoD pairs for the targets, the one or more processors are configured to:
calculate an eigenvalue decomposition of difference of autocorrelation matrices based on the SABF signal and the SABN signal,
estimate a total quantity of positive eigenvalues of the eigenvalue decomposition of difference,
calculate angular spectrums for the AoAs based on the total quantity of positive eigenvalues, and
estimate the AoA and AoD pairs based on the angular spectrums for the AoAs;
perform post-processing of the AoA and AoD pairs to modify estimation accuracies for the AoA and AoD pairs;
estimate path loss values for paths of the targets;
utilize a triangulation technique to determine positions of the targets based on the AoA and AoD pairs; and
perform one or more actions based on the positions of the targets.

8. The device of claim 7,
wherein the one or more processors are further configured to:
receive communication pilots from the other device;
determine transmitter calibration coefficients for the other device and receiver calibration coefficients for the device based on the communication pilots; and
calibrate a receiver antenna array of the device with the receiver calibration coefficients.

9. The device of claim 8,
wherein the one or more processors are further configured to:
provide the transmitter calibration coefficients to the other device to cause the other device to calibrate a transmitter antenna array of the other device with the transmitter calibration coefficients.

10. The device of claim 8,
wherein the transmitter calibration coefficients and the receiver calibration coefficients are determined based on a line-of-sight path between a transmitter antenna array of the other device and the receiver antenna array.

11. The device of claim 7, wherein the SABF signal is generated based on a transmit precoder matrix that is determined based on an ideal sensing beam pattern that maximizes a signal power in a transmitter target angular region.

12. The device of claim 7, wherein the SABN signal is generated based on a transmit precoder matrix determined based on an ideal sensing beam pattern that minimizes a signal power in a transmit target angular region.

13. The device of claim 7, further comprising: causing performance of a beam sweeping operation to scan a set of transmit target angular regions and to detect the targets.

14. The device of claim 7, wherein, to perform the one or more actions, the one or more processors are configured to:
track one or more moving objects in a factory based on the positions of the targets; or
prevent collisions between one or more of autonomous vehicles, robots, or people.

15. A non-transitory computer-readable medium storing a set of instructions, the set of instructions comprising:
one or more instructions that, when executed by one or more processors of a device, cause the device to:
estimate an angle-of-arrival (AoA) and angle-of-departure (AoD) pair for a target based on a sensing-aware beam-forming (SABF) signal and a sensing-aware beam-nulling (SABN) signal received from another device,
wherein the one or more instructions, that cause the device to estimate the AoA and AoD pair for the target, cause the device to:
calculate an eigenvalue decomposition of difference of autocorrelation matrices based on the SABF signal and the SABN signal;
estimate a total quantity of positive eigenvalues of the eigenvalue decomposition of difference;
calculate an angular spectrum for the AoA based on the total quantity of positive eigenvalues; and
estimate the AoA and AoD pair based on the angular spectrum for the AoA;
perform post-processing of the AoA and AoD pair to modify an estimation accuracy for the AoA and AoD pair;
estimate a path loss value for a path of the target;
determine a position of the target based on the AoA and AoD pair; and perform one or more actions based on the position of the target.

16. The non-transitory computer-readable medium of claim 15, wherein the one or more instructions, that cause the device to perform post-processing of the AoA and AoD pair, cause the device to:
eliminate outliers for the AoA and AoD pair to modify the estimation accuracy for the AoA and AoD pair;
eliminate a line-of-sight path for the AoA and AoD pair to modify the estimation accuracy for the AoA and AoD pair; or
merge the target with substantially similar AoA and AoD pairs to modify the estimation accuracy for the AoA and AoD pair.

17. The non-transitory computer-readable medium of claim 15, wherein the one or more instructions, that cause the device to determine the position of the target based on the AoA and AoD pair, cause the device to:
utilize a triangulation technique to determine the position of the target based on the AoA and AoD pair.

18. The non-transitory computer-readable medium of claim 15, wherein the one or more instructions further cause the device to:
receive communication pilots from the other device;
determine transmitter calibration coefficients for the other device and receiver calibration coefficients for the device based on the communication pilots; and
calibrate a receiver antenna array of the device with the receiver calibration coefficients.

19. The non-transitory computer-readable medium of claim 18, wherein the one or more instructions further cause the device to:
provide the transmitter calibration coefficients to the other device to cause the other device to calibrate a transmitter antenna array of the other device with the transmitter calibration coefficients.

20. The non-transitory computer-readable medium of claim 15, wherein the one or more instructions further cause the device to:
track one or more moving objects in a factory based on the position of the target; or
prevent collisions between one or more of autonomous vehicles, robots, or people.

*  *  *  *  *